United States Patent
Aoki

(10) Patent No.: US 9,560,689 B2
(45) Date of Patent: Jan. 31, 2017

(54) COMMUNICATION DEVICE, CONTROL METHOD, AND STORAGE MEDIUM

(71) Applicant: CANON KABUSHIKI KAISHA, Tokyo (JP)

(72) Inventor: Hitoshi Aoki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 157 days.

(21) Appl. No.: 14/626,061

(22) Filed: Feb. 19, 2015

(65) Prior Publication Data
US 2015/0245399 A1    Aug. 27, 2015

(30) Foreign Application Priority Data

Feb. 26, 2014   (JP) ................................. 2014-036001

(51) Int. Cl.
*H04W 4/00* (2009.01)
*H04W 76/02* (2009.01)
*H04W 84/12* (2009.01)

(52) U.S. Cl.
CPC ........... *H04W 76/023* (2013.01); *H04W 84/12* (2013.01)

(58) Field of Classification Search
CPC ............................ H04W 76/023; H04W 84/12
See application file for complete search history.

(56) References Cited

U.S. PATENT DOCUMENTS

| | | | |
|---|---|---|---|
| 2010/0046455 A1* | 2/2010 | Wentink | H04W 36/06 370/329 |
| 2011/0007692 A1* | 1/2011 | Seok | H04W 40/22 370/328 |
| 2012/0051240 A1* | 3/2012 | Dwivedi | H04W 76/023 370/252 |
| 2013/0148545 A1* | 6/2013 | Jung | H04W 48/16 370/255 |
| 2013/0176903 A1* | 7/2013 | Bijwe | H04W 76/022 370/255 |
| 2013/0188628 A1* | 7/2013 | Lee | H04W 48/14 370/338 |
| 2013/0229931 A1* | 9/2013 | Kim | H04W 24/10 370/252 |
| 2014/0328168 A1* | 11/2014 | Park | H04W 74/0808 370/230 |

(Continued)

*Primary Examiner* — Clemence Han
(74) *Attorney, Agent, or Firm* — Carter, DeLuca, Farrell & Schmidt, LLP

(57) ABSTRACT

A communication device establishes a first connection to a first other communication device, establishes, based on the first connection, a second connection to a second other communication device that is connected to the first other communication device, while the first connection has been established, and then performs direct communication with the second other communication device using the second connection. The communication device determines whether an operation mode of the first connection is a mode in which a periodic search for other networks is performed while a network has been established by the first connection. If the operation mode is the mode in which the periodic search is performed, the communication device restricts at least one of establishment of the second connection and switching of a channel in the second connection while the first connection has been established.

21 Claims, 13 Drawing Sheets

(56) References Cited

U.S. PATENT DOCUMENTS

| | | | | |
|---|---|---|---|---|
| 2014/0355527 A1* | 12/2014 | Vaidya | ............... | H04W 76/025 |
| | | | | 370/329 |
| 2015/0139156 A1* | 5/2015 | Thakur | ............... | H04W 76/023 |
| | | | | 370/329 |
| 2015/0172905 A1* | 6/2015 | Qi | ...................... | H04W 8/005 |
| | | | | 370/338 |
| 2015/0201443 A1* | 7/2015 | Emani | ................ | H04W 76/023 |
| | | | | 370/338 |
| 2015/0373758 A1* | 12/2015 | Kim | ...................... | H04W 8/26 |
| | | | | 370/329 |

* cited by examiner

COMMUNICATION DEVICE, CONTROL METHOD, AND STORAGE MEDIUM

BACKGROUND OF THE INVENTION

Field of the Invention

The present invention relates to a connection control technique in wireless communication.

Description of the Related Art

In recent years, wireless LAN communication systems, which are represented by IEEE802.11 standard series, are widely used. With a wireless LAN, a base station called an access point (hereinafter, AP) and a station (hereinafter, STA) that exists within an area within which a radio wave of the AP can reach and that is in a wirelessly connected state establish a connection, establish a network, and perform wireless communication. Recently, on more occasions, the IEEE802.11n standard is used with which the communication speed can be raised, among the IEEE802.11 standard series.

IEEE802.11n supports a first mode (hereinafter referred to as "HT20") in which operation is performed with a conventional 20-MHz frequency bandwidth, and a second mode (hereinafter referred to as "HT40") in which operation is performed with a 40-MHz frequency bandwidth, which is twice the aforementioned conventional frequency bandwidth, for the purpose of high-speed communication. However, in an environment in which the HT40 is used, there have been cases where a conventional wireless device that does not support IEEE802.11n cannot perform carrier sensing, resulting in a collision between frames. In particular, a 2.4-GHz band is likely to be affected by surrounding BSSes as compared with a 5-GHz band, since wireless channels are overlapped with one another.

For this reason, in IEEE802.11n, OBSS (Overlapping Basic Service Set) Scan is defined for STAs that operate with the 2.4-GHz HT40. The OBSS Scan is a periodic search for surrounding networks performed by a STA operating with the HT40. Specifically, with the OBSS Scan, surrounding wireless networks that do not support the IEEE802.11n standard and surrounding wireless networks that do not allow the HT40 are found. If these wireless networks are found, the STA transmits a report to an AP of the wireless network that the STA has joined. The AP then switches its network from a wireless network that supports the HT40 to a wireless network that supports only the HT20, as necessary. The STA that operates with the 2.4-GHz HT40 needs to execute this OBSS Scan.

On the other hand, methods have emerged for performing communication not only with a simple wireless network configuration using conventional APs and STAs, but also in various modes of wireless LAN network. For example, Tunneled Direct Link Setup (TDLS) has been proposed as a technique for communication between STAs that are connected to an AP, using a direct connection (direct link). IEEE Std 802.11-2012 describes a technique of forming a direct connection between wireless STAs by transmitting and receiving control data for setting TDLS, between wireless LAN terminals via an AP. Since each wireless LAN terminal directly communicates with a partner terminal by forming a direct connection, communication can be performed that is not affected by restriction due to the capability of the AP.

With TDLS, a channel for direct communication between STAs is not fixed to a channel (hereinafter referred to as a "base channel") of a wireless network configured by the AP and can be switched to another channel (hereinafter referred to as an "off-channel"). As a result, for example, even when the AP operates with a 2.4-GHz band, a STA can directly communicate with the partner STA by using a 5-GHz band channel.

In the present situation, the influence of channel switching for direct communication using TDLS on a connection between an AP and a STA has not been considered. For example, when the operation mode of a connection between an AP and a STA is the 2.4-GHz HT40, the STA is required to periodically execute the OBSS Scan, whereas the problem in switching of the channel in the direct communication in this case has not been examined.

The present invention has been made in view of the aforementioned problem, and provides, in a communication system in which a second connection is established based on a first connection, connection control in which the influence of the second connection on the first connection is considered.

SUMMARY OF THE INVENTION

According to an aspect of the present invention, there is provided a communication device comprising: a connection unit configured to establish a first connection to a first other communication device, establish, based on the first connection, a second connection to a second other communication device that is connected to the first other communication device, while the first connection has been established, and perform direct communication with the second other communication device using the second connection; a determination unit configured to determine whether an operation mode of the first connection is a mode in which a periodic search for another network is performed while a network has been established by the first connection; and a control unit configured to, if the operation mode of the first connection is the mode in which the periodic search is performed, control the connection unit so as to restrict at least one of establishment of the second connection and switching of a channel in the second connection, while the first connection has been established.

According to an aspect of the present invention, there is provided a communication device comprising: a connection unit configured to establish a first connection to a first other communication device, establish, based on the first connection, a second connection to a second other communication device that is connected to the first other communication device, while the first connection has been established, and perform direct communication with the second other communication device using the second connection; a determination unit configured to determine whether an operation mode of the first connection is a first mode in which a periodic search for another network is performed while a network has been established by the first connection; and a control unit configured to, if the operation mode of the first connection is the first mode, and establishment of the second connection or switching of a channel in the second connection is performed, perform control such that the operation mode of the first connection is switched to a second mode in which the periodic search for another network is not performed while the network has been established by the first connection.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Note that a description will be given below of the case where a wireless LAN conforming to the IEEE802.11 standard series, in particular a wireless LAN conforming to the IEEE802.11n standard is used. However, the following embodiments describe examples, and the present invention is not limited thereto and is also applicable in the case where other similar systems are used. That is to say, the following discussion is applicable to any system in which a communication device establishes a first connection between the communication device and a first other communication device, and establishes, based on the first connection, a second connection between the communication device and a second other communication device that is connected to the communication device and the first other communication device. Note that the communication device and the second other communication device in this case correspond to terminals (STAs) in a wireless LAN, the first other communication device corresponds to a base station (AP) in the wireless LAN, the first connection is a connection between an AP and a STA, and the second connection is a direct connection between STAs by means of TDLS, for example.

Exemplary Configuration of Wireless Communication System

Figure 1:
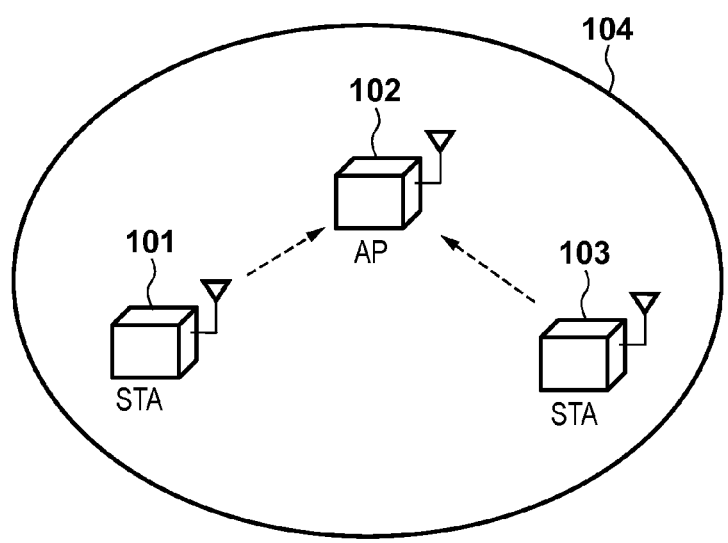
FIG. 1 is a diagram showing an exemplary configuration of a wireless communication system.

An exemplary configuration of a wireless communication system in the embodiments described below is shown in FIG. 1. A STA 101 is a terminal (STA) in a wireless LAN that conforms to the IEEE802.11n standard. The STA 101 has joined a wireless network 104 formed by a base station (AP) 102 in the wireless LAN. The AP 102 is a base station (access point) of the wireless LAN that forms the wireless network 104. The STA 103 is a STA that has joined the wireless network 104. The wireless network 104 is a 2.4-GHz wireless LAN network, for example, generated by the AP 102, and STAs, namely the STA 101 and the STA 103 have joined the wireless network 104 in the example in FIG. 1.

If the wireless network 104 is a wireless network in which communication can be performed in the first mode (HT40), the STA 101 joins the wireless network with the HT40. Furthermore, if the STA 101 has joined the 2.4-GHz wireless network with the HT40, the STA 101 periodically executes OBSS (Overlapping Basic Service Set) Scan in conformity to the IEEE802.11n standard. The OBSS Scan is executed for 1ch to 11ch.

Note that the HT40 is an operation mode of a connection between a STA and an AP, and is a mode (e.g., 2.4-GHz HT40) that requires a periodic search for other networks while the connection has been established. Here, as mentioned above, the HT40 is an operation mode in which communication is performed using a 40-MHz bandwidth for the purpose of high-speed communication in IEEE802.11n. Other operation modes of a connection between a STA and an AP include a conventional operation mode (HT20) in which operation is performed with a 20-MHz frequency bandwidth. Here, the HT20 is an operation mode that does not require the periodic search for other networks. Note that the HT40 is a mode in which higher-speed communication than with the HT20 is possible.

On the other hand, if the wireless network 104 is a wireless network in which communication with the HT40 cannot be performed and only communication with the HT20 is possible, the STA 101 joins the wireless network with the HT20 and does not execute the OBSS Scan.

Outline

Prior to the description of the embodiments of the present invention, an outline of the technique will be described. First, in order to smooth the following description of the embodiments, an example will be described of the influence that a direct connection between a first STA and a second STA may possibly exert on an AP-STA connection between the first STA and an AP.

The case will be examined in which the STA 101, while executing the OBSS Scan, receives a request to switch a channel for direct communication from another STA, namely a STA 103, to which the STA 101 has established a direct connection. In this case, if the STA 101 switches the channel in accordance with the received request, the STA 101 needs to again execute the OBSS Scan that was in the middle of execution, after switching the channel. However, at this time, a problem may possibly arise regarding the channel to which the STA 101 is to return. For example, consider the case where the channel (base channel) of the wireless network formed by the AP is 3ch, the channel (off-channel) for direct communication between STAs is 36ch, and the search is performed on the OBSS Scan for 1ch to 11ch in order. If the STA 101 switches its channel to 36ch while scanning 5ch with the OBSS Scan, there are cases where the STA 101, when returning from the off-channel, returns to 3ch, which is the base channel, rather than to the channel on which the STA 101 was performing the OBSS Scan. For this reason, in some cases, the STA 101 does not execute the OBSS Scan for 5ch and subsequent channels. There are also cases where the STA 101, after similarly switching the channel, returns to 6ch, which is to be scanned next, even though the STA 101 was in the middle of scanning of 5ch, and does not scan 5ch within a prescribed time period.

If the STA 101 successively receives channel switching requests during the OBSS Scan, the STA 101 successively moves to channels other than the base channel while receiving these requests, and accordingly there are cases where the STA 101 cannot execute the OBSS Scan for a while. Here, the OBSS Scan needs to be executed at an interval designated by the AP 102. For this reason, such behavior of the STA 101 is not allowed in some cases. As described above, if a direct connection is established and, in particular, switching of the channel occurs when the OBSS Scan needs to be executed, there are cases where processing becomes complicated and the OBSS Scan cannot be stably performed.

Therefore, a communication device according to the following embodiments performs communication control for handling these problems. Specifically, a communication device (STA 101) checks whether an operation mode of a first connection to a first other communication device (AP 102) is a first mode in which the periodic search for other networks is performed while the connection has been established, such as the 2.4-GHz HT40. If the operation mode of the first connection is the first mode, the communication device performs control so as not to perform at least one of establishment of a second connection to a second other communication device (a STA that is to be a partner device of a direct connection) and switching of the channel in the second connection, for example. Furthermore, if establishment of the second connection or switching of the channel in the second connection occurs while the operation mode of the first connection is the aforementioned first mode, the communication device may switch the operation mode of the first connection to a mode in which the periodic search for other networks is not performed.

With this configuration, establishment of the second connection (a direct connection between STAs) and switching of the channel in the second connection are restricted, depending on the cases. That is to say, at least one of establishment of the second connection and switching of the channel is performed only when, for example, the operation mode of the first connection (a connection between a STA and an AP) is not a mode in which the periodic search for other networks is performed, such as the 2.4-GHz HT40. For this reason, the influence of the second connection on the first connection can be suppressed.

In the following embodiments, the above processing and a configuration of a communication device that performs this processing will be described in detail.

Embodiment 1

In the present embodiment, when the operation mode of the first connection between the STA 101 and the AP 102 is the 2.4-GHz HT40, the STA 101 restricts the second connection (direct connection) to the STA 103, thereby preventing switching of a channel in the second connection. The STA 101 thereby prevents switching of the channel in the second connection from occurring during the OBSS Scan in the first connection, and prevents a malfunction of channel control.

Functional Configuration of STA 101

Figure 2:
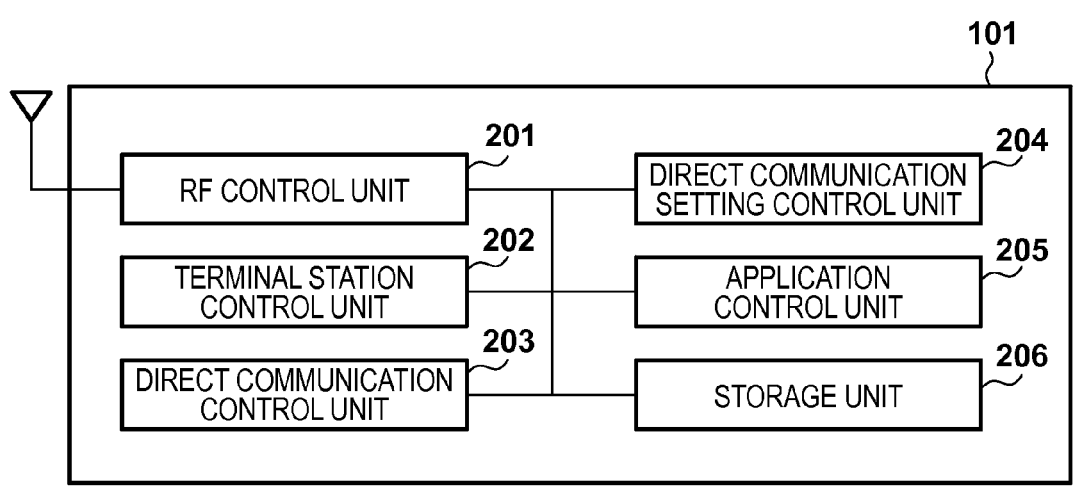
FIG. 2 is a block diagram showing an exemplary functional configuration of a STA 101 in Embodiment 1.

FIG. 2 is a block diagram showing an exemplary functional configuration of the STA 101 according to the present embodiment. The STA 101 has an RF control unit 201, a terminal station control unit 202, a direct communication control unit 203, a direct communication setting control unit 204, an application control unit 205, and a storage unit 206, for example. One or more of these functional units can be implemented by one or more processors (CPUs) executing a computer program that can be stored in a storage medium, such as a memory (RAM or ROM).

The RF control unit 201 is configured to include an antenna for transmitting or receiving a wireless signal from/to other wireless LAN communication devices, a circuit, and a program for controlling them. The terminal station control unit 202 is configured to include hardware and a program for controlling the RF control unit 201 and functioning as a wireless LAN STA (terminal), for example. The terminal station control unit 202 performs control such that the STA 101 joins, as a terminal, the wireless network 104 and communicates with the AP 102.

The direct communication control unit 203 is configured to include hardware and a program for controlling the RF control unit 201, and directly communicating with the STA 103 without via the AP 102 after establishing, via the AP 102, a direct connection to the STA 103, for example. The direct communication setting control unit 204 is configured to include a program for determining setting control related to direct communication when a request to establish a direct connection is given from the STA 103 via the AP 102, for example. The specific control of the direct communication setting control unit 204 will be described later using FIGS. 4 and 6.

The application control unit 205 is configured to include software and hardware for controlling an application that operates on the STA 101, for example. The STA 101 communicates with communication devices in other wireless LANs in accordance with an instruction of the application control unit 205. The storage unit 206 is constituted by a ROM and a RAM for saving a program and data by which the STA 101 operates, for example.

Processing Flow

In the present embodiment, the STA 101 checks whether the operation mode of the first connection to the AP 102 is a mode in which the periodic search for other networks is performed while the connection has been established, such as the 2.4-GHz HT40. If the operation mode of the first connection is the first mode, the STA 101 performs control so as not to perform at least one of establishment of the second connection (direct connection) to the STA 103 and switching of the channel in the second connection, for example. A flow of this processing will be described below using FIGS. 3 to 10.

Processing Example 1

Figure 3:
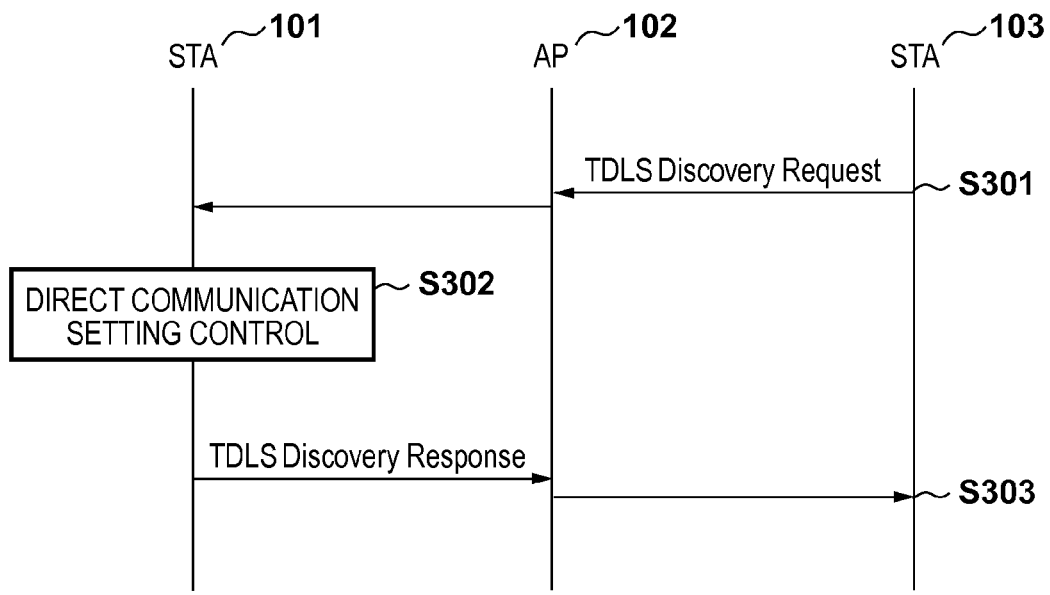
FIG. 3 is a sequence chart showing a first example of a processing flow in Embodiment 1.

FIG. 3 shows a first example of a processing flow in the present embodiment. In this example, the STA 101 receives a TDLS Discovery Request from the STA 103 via the AP 102. The TDLS Discovery Request is a frame that is defined in the IEEE802.11 standard and is transmitted in order to find other STAs with which direct communication can be performed.

Initially, the STA 103 broadcasts a discovery request (TDLS Discovery Request) for searching for STAs with which direct communication can be performed. The AP 102, upon receiving this TDLS Discovery Request, broadcasts the received signal. Thereafter, the TDLS Discovery Request transmitted by the AP 102 is received by the STA 101 (S301). The STA 101, upon receiving the TDLS Discovery Request, executes direct communication setting control processing for determining whether the STA 101 is in a state of being able to establish a direct connection (S302).

Figure 4:
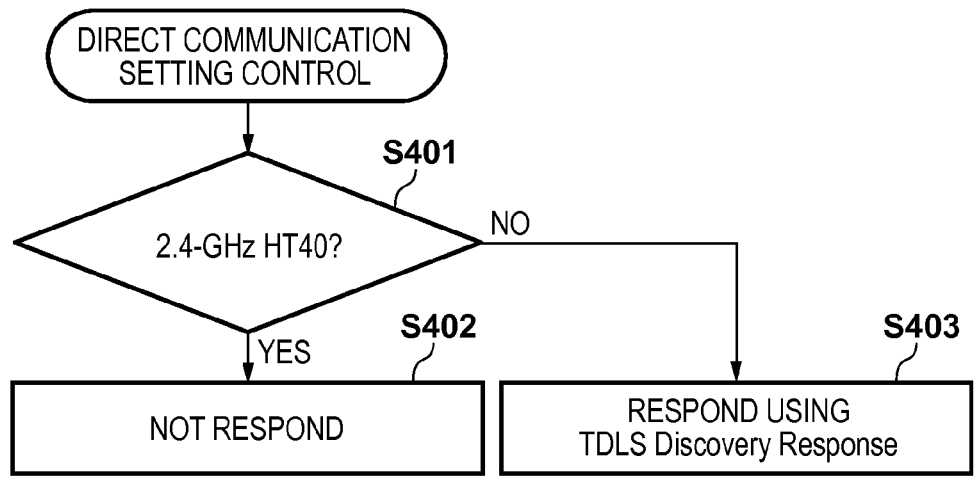
FIG. 4 is a flowchart showing a first operation example of direct communication setting control in Embodiment 1.

FIG. 4 shows a processing flow of the direct communication setting control in this case. The processing in FIG. 4 is executed by the direct communication setting control unit 204.

In this processing, the direct communication setting control unit 204 determines whether the STA 101 has joined the wireless network 104 with the 2.4-GHz HT40 (S401). If the STA 101 has joined the wireless network 104 with the 2.4-GHz HT40 (YES in S401), the direct communication setting control unit 204 determines not to response to the received TDLS Discovery Request (S402). That is to say, the direct communication setting control unit 204 determines not to respond to the TDLS Discovery Request if the operation mode of the connection between the STA 101 and the AP 102 is a mode in which the periodic search for other networks is performed. Establishment of a direct connection to the STA 103 is thereby restricted, and it is possible to prevent the direct connection from affecting the periodic search for other networks in the connection between the STA 101 and the AP 102.

On the other hand, if it is determined that the STA 101 has not joined the wireless network 104 with the 2.4-GHz HT40 (NO in S401), the direct communication setting control unit 204 determines to respond to the received TDLS Discovery Request (S403). Note that the response signal in this case is a TDLS Discovery Response. This is because, in this case, the STA 101 does not need to periodically search for other networks, and accordingly no problem arises even if a direct connection is established and the channel is changed.

Returning to FIG. 3, if it is determined that the TDLS Discovery Response is to be transmitted, the STA 101 responds by transmitting the TDLS Discovery Response to the STA 103 via the AP 102 (S303). On the other hand, if it is determined in step S402 that a response is not to be given, the STA 101 does not transmit the TDLS Discovery Response in step S303.

With the above processing, if the STA 101 is connected to the AP 102 with the 2.4-GHz HT40, the other STA, namely the STA 103 does not receive the TDLS Discovery Response from the STA 101. For this reason, the STA 103 determines that the STA 101 is a STA which cannot execute TDLS. On the other hand, in the case of the HT20, the STA 103 receives the TDLS Discovery Response from the STA 101, and accordingly can determine that the STA 101 is a STA which can execute TDLS.

Processing Example 2

Figure 5:
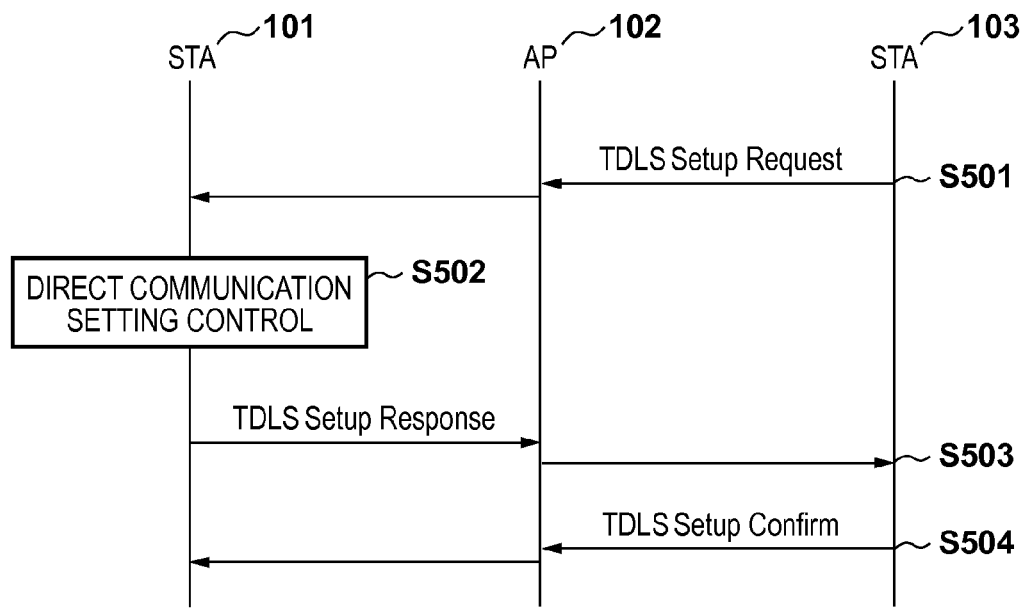
FIG. 5 is a sequence chart showing a second example of a processing flow in Embodiment 1.

FIG. 5 shows a second example of a processing flow in the present embodiment. In this example, the STA 101 receives a TDLS Setup Request from the STA 103 via the AP 102. A TDLS Setup Request is a frame for giving a request that is defined in the IEEE802.11 standard and is for establishing a direct connection.

Initially, the STA 103 transmits a TDLS Setup Request to the STA 101 via the AP 102 in order to establish a direct connection to the STA 101 (S501). The STA 101, upon receiving the TDLS Setup Request, executes direct communication setting control processing in order to determine whether the STA 101 is in a state of being able to execute direct communication (S502).

Figure 6:
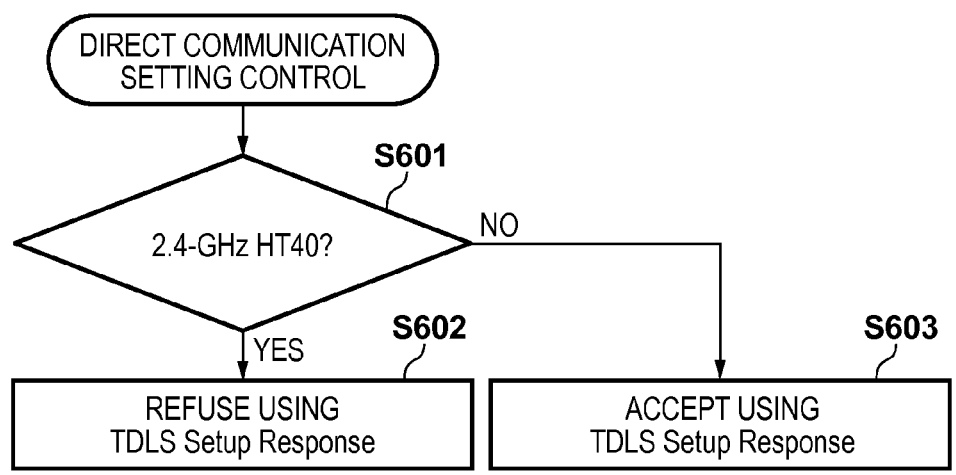
FIG. 6 is a flowchart showing a second operation example of direct communication setting control in Embodiment 1.

FIG. 6 shows a processing flow of the direct communication setting control in this case. The processing in FIG. 6 is executed by the direct communication setting control unit 204, as in the processing example 1.

In this processing, the direct communication setting control unit 204 determines whether the STA 101 has joined the wireless network 104 with the 2.4-GHz HT40, as in step S401 in the processing example 1 (S601). If the STA 101 has joined the wireless network 104 with the 2.4-GHz HT40 (YES in S601), the direct communication setting control unit 204 decides to refuse the received TDLS Setup Request (S602). That is to say, if the operation mode of the connection between the STA 101 and the AP 102 is a mode in which the periodic search for other networks is performed, the direct communication setting control unit 204 refuses the TDLS Setup Request. In this case, the STA 101 designates REFUSED (=1) as a Status Code of the TDLS Setup Response frame and transmits it. Establishment of a direct connection to the STA 103 is thereby restricted, and it is possible to prevent the direct connection from affecting the periodic search for other networks in the connection between the STA 101 and the AP 102. Note that the Status Code designated here may be any value for refusing establishment of a direct connection, and other values may be used as long as the values are other than SUCCESS (=0). Furthermore, the STA 101 may communicate the refusal of establishment of a connection by not responding, rather than by responding using the TDLS Setup Response.

On the other hand, if it is determined that the STA 101 has not joined the wireless network 104 with the 2.4-GHz HT40 (NO in S601), the direct communication setting control unit 204 determines not to refuse the received TDLS Setup Request, and to respond thereto (S603). That is to say, in this case, the STA 101 designates SUCCESS (=0) as a Status Code of the TDLS Setup Response frame and transmits it.

Returning to FIG. 5, the STA 101, after executing the aforementioned direct communication setting control, transmits the TDLS Setup Response containing the Status Code corresponding to the determination to the STA 103 via the AP 102 (S503). If the STA 103 receives the TDLS Setup Response with the Status Code that is SUCCESS, the STA 103 transmits TDLS Setup Confirm (S504), and a direct connection between the STA 101 and the STA 103 is thereby established. On the other hand, if the Status Code is other than SUCCESS, e.g., if the Status Code is REFUSED, the STA 103 does not transmit the TDLS Setup Confirm in step S504. Accordingly, in this case, a direct connection is not established.

As described above, in the processing examples 1 and 2, even if the STA 101 receives a request to search for a partner device of a direct connection or a request to establish a direct connection, the STA 101 does not respond to the request or refuses it, in order to restrict the setting of the direct communication. With this configuration, the STA 101 does not establish a direct connection to other STAs when the STA 101 has joined the wireless network 104 with the 2.4-GHz HT40. A direct connection is thereby not established, and accordingly switching of the channel in the direct connection does not occur. That is to say, channel switching of TDLS (TDLS channel switching) does not occur when the STA 101 has joined the wireless network 104 with the 2.4-GHz HT40, i.e., when the STA 101 needs to execute the OBSS Scan. Therefore, the OBSS Scan can be prevented from becoming unstable due to switching of the channel.

Processing Example 3

Figure 7:
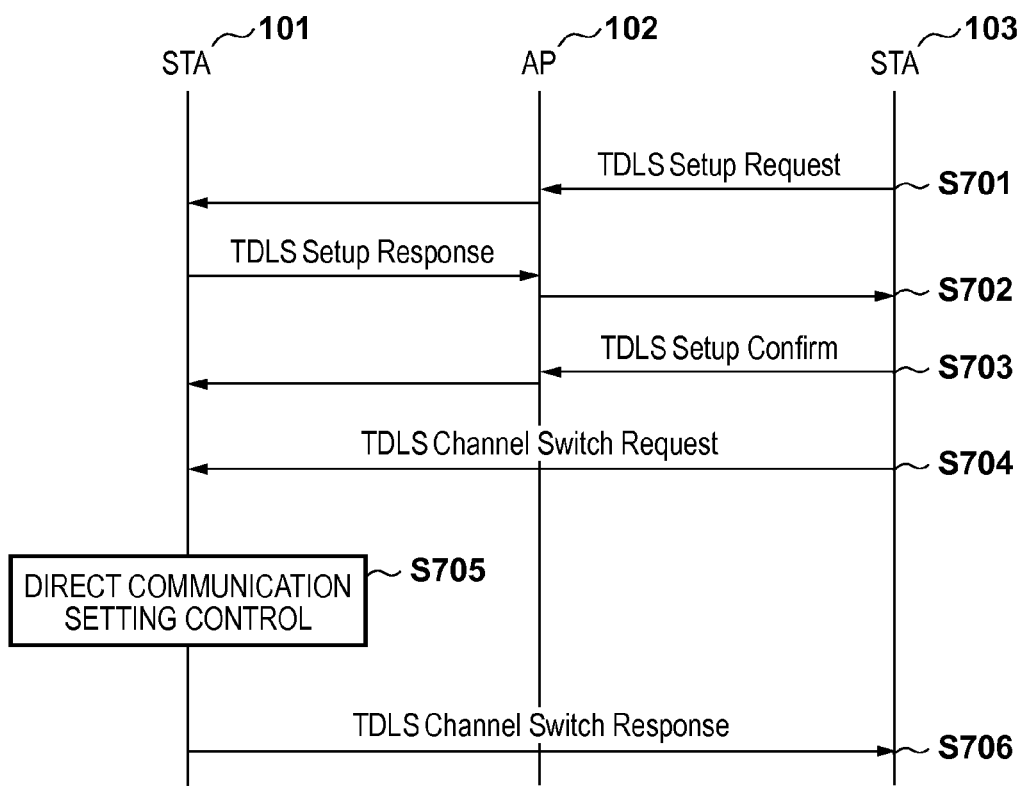
FIG. 7 is a sequence chart showing a third example of a processing flow in Embodiment 1.

FIG. 7 shows a third example of a processing flow in the present embodiment. In this example, the STA 101 receives a request (TDLS Channel Switch Request) to switch the channel from the STA 103 via the AP 102. A TDLS Channel Switch Request is a frame that is defined in the IEEE802.11 standard and is for giving a request to switch the channel from the base channel to the off-channel. Note that the TDLS Channel Switch Request is transmitted after a direct connection by means of TDLS is established.

That is to say, in this example, a direct connection is first established between the STA 101 and the STA 103. Specifically, the STA 101, upon receiving the TDLS Setup Request from the STA 103, responds using a TDLS Setup Response with a Status Code that is SUCCESS (=0) (S702). The STA 103, upon receiving the TDLS Setup Response with the Status Code that is SUCCESS, transmits TDLS Setup Confirm (S703). A direct connection between the STA 101 and the STA 103 is thereby established.

After the direct connection is established, the STA 103 directly transmits a TDLS Channel Switch Request to the STA 101 without via the AP 102 before transmitting data, in order to switch the channel (S704). The STA 101, upon receiving the TDLS Channel Switch Request, executes direct communication setting control processing (S705).

Figure 8:
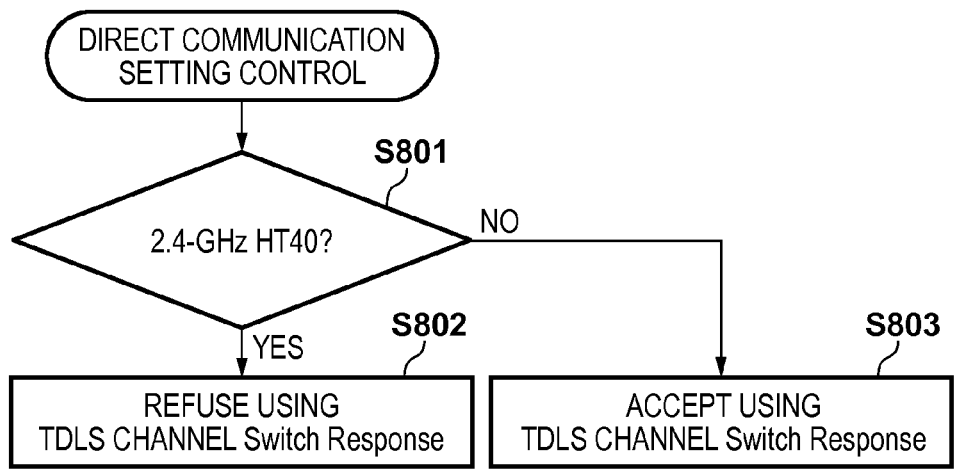
FIG. 8 is a flowchart showing a third operation example of direct communication setting control in Embodiment 1.

FIG. 8 shows a processing flow of the direct communication setting control in this case. The processing in FIG. 8 is executed by the direct communication setting control unit 204, as in the processing examples 1 and 2.

In this processing, the direct communication setting control unit 204 initially determines whether the STA 101 has joined the wireless network 104 with the 2.4-GHz HT40, as in the processing examples 1 and 2 (S801). If the STA 101 has joined the wireless network 104 with the 2.4-GHz HT40 (YES in S801), the direct communication setting control unit 204 decides to refuse the request to switch the channel (S802). That is to say, if the operation mode of the connection between the STA 101 and the AP 102 is a mode in which the periodic search for other networks is performed, the direct communication setting control unit 204 refuses the TDLS Channel Switch Request. In this case, the STA 101 designates REFUSE (=1) as a Status Code of the TDLS Channel Switch Response and transmits it, for example. Switching of the channel in the direct connection to the STA 103 is thereby restricted, and it is possible to prevent the direct connection from affecting the periodic search for other networks in the connection between the STA 101 and the AP 102. Note that the Status Code designated here may be any value for refusing the channel switching request, and the channel switching request may be refused by substituting a value other than SUCCESS (=0) for the Status Code. Furthermore, the refusal of switching of the channel may be communicated by not responding to the channel switching request. Note that a description will be given below of the case where a response is given with REFUSE (=1) designated as the Status Code when the channel switching request is refused.

Note that, on the other hand, if the STA 101 has not joined the wireless network 104 with the 2.4-GHz HT40 in step S801 (NO in S801), the direct communication setting control unit 204 decides to accept the channel switching request (S803). In this case, the STA 101 designates SUCCESS (=0) as a Status Code of the TDLS Channel Switch Response and transmits it.

Returning to FIG. 7, the STA 101, after executing the aforementioned direct communication setting control, transmits the TDLS Channel Switch Response containing the Status Code corresponding to the determination, to the STA 103 via the AP 102 (S706). If the STA 103 receives the TDLS Channel Switch Response with the Status Code that is SUCCESS (=0), the STA 101 and the STA 103 switch their channel to the off-channel in conformity to the IEEE802.11 standard. Then the STA 101 and the STA 103 start direct communication. On the other hand, if the STA 103 receives the TDLS Channel Switch Response with the Status Code that is REFUSE (=1), switching of the channel is not performed and the processing is finished in this state.

With this configuration, in this example, switching of the channel in a direct connection is not performed when the STA 101 has joined the wireless network 104 with the 2.4-GHz HT40. For this reason, it is possible to prevent the OBSS Scan operation from becoming unstable as a result of switching the channel.

In this example, unlike in the above processing examples 1 and 2, even when the STA 101 has joined the wireless network 104 with the 2.4-GHz HT40, the STA 101 can establish a direct connection to the STA 103 and directly communicate therewith without via the AP 102. Communication overhead caused due to communicating via the AP 102 can thereby be reduced. Furthermore, communication beyond the communication capability of the wireless network 104 can be performed between the STA 101 and the STA 103. For example, even when the AP 102 supports only 64QAM as a modulation method in the 2.4-GHz HT40, 256QAM can be used as a modulation method in the communication between the STA 101 and the STA 103, and high-speed communication can be realized.

Processing Example 4

Unlike the above processing examples 1 to 3, this example will describe the case where a direct connection operation is restricted while the OBSS Scan is actually being performed, rather than that the direct connection operation is restricted depending on whether the communication device has joined the wireless network 104 with the 2.4-GHz HT40. That is to say, in this example, switching of the channel in a direct connection is allowed except during the execution period of the OBSS Scan that is affected by the switching of the channel by a direct connection in some cases. Note that the processing described below is performed when the STA 101 has joined the wireless network 104 with the 2.4-GHz HT40, and the STA 101 may also determine whether the operation mode is the 2.4-GHz HT40, prior to the processing.

Figure 9:
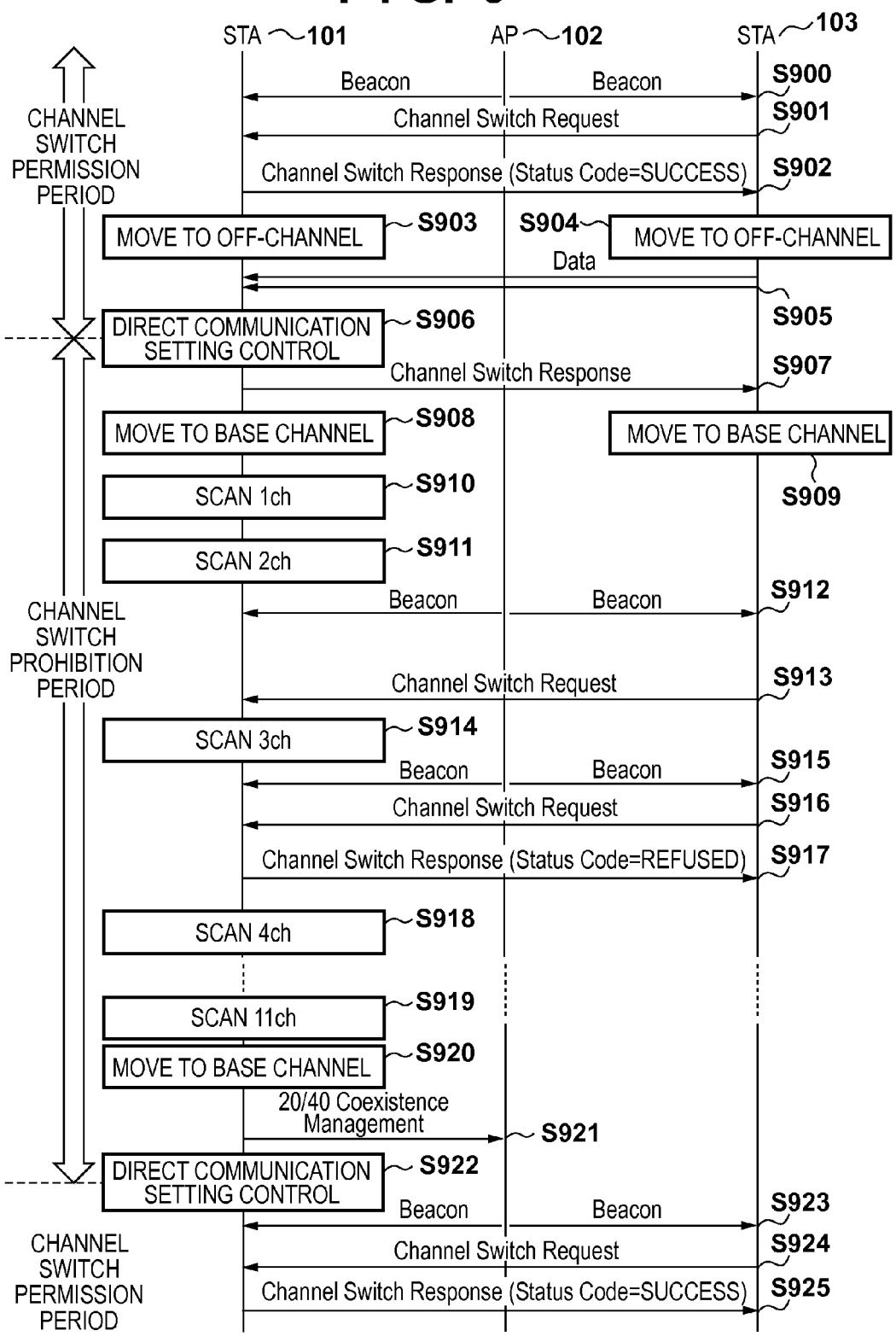
FIG. 9 is a sequence chart showing a fourth example of a processing flow in Embodiment 1.

FIG. 9 shows a processing flow in this example. Note that it is assumed in this example that the base channel of the wireless network 104 is 3ch, and the off-channel to which the channel of the STA 101 and the STA 103 may possibly be switched is 9ch. It is also assumed in this example that a direct connection has already been established between the STA 101 and the STA 103, and the STA 101 periodically receives the TDLS Channel Switch Request from the STA 103. Note that, although the restriction on switching of the channel during an OBSS Scan period will be described below based on the premise that a direct connection has been established, this example is not limited thereto. That is to say, for example, if a request to search for a partner device of a direct connection or a request to establish a direct connection is given from the STA 103 during the OBSS Scan period, the STA 101 may be configured not to respond to these requests, or may refuse these requests. Furthermore, in this case, the STA 101 accepts these requests only if the request to search for a partner device of a direct connection or the request to establish a direct connection is given from the STA 103 during a time period other than the OBSS Scan period, for example.

It is also assumed that the STA 101 starts a series of processing for performing the OBSS Scan at the timing of step S906, and has not yet started the OBSS Scan at the time of the start in FIG. 9, i.e., at the time of step S901. Steps S900, S912, S915, and S923 indicate Beacons that are periodically broadcast by the AP 102 over the base channel. Note that, although these Beacons may possibly be received by the STA 101 and the STA 103, FIG. 9 only schematically expresses it, and the Beacons do not necessarily need to be transmitted and received at the shown timings.

In this processing, initially, the STA 103 transmits a TDLS Channel Switch Request to the STA 101 (S901). The STA 101, upon receiving the TDLS Channel Switch Request, accepts this request since it is not yet the timing of starting the OBSS Scan. That is to say, the STA 101 designates SUCCESS as a Status Code and transmits a TDLS Channel Switch Response (S902). The STA 101, upon transmitting the TDLS Channel Switch Response, switches its channel to the off-channel (S903). The STA 103, upon receiving the TDLS Channel Switch Response, switches its channel to the off-channel (S904). Note that the order of the processing in steps S903 and S904 may possibly be reversed depending on the timings of transmitting and receiving signals to/from the STA and the time taken to switch the channel. Thereafter, the STA 103 transmits data to the STA 101 over the off-channel (S905).

The STA 101 performs direct communication setting control simultaneously with the timing of starting the OBSS Scan (S906). Specifically, the STA 101 configures a setting so as to prohibit switching of the channel of TDLS during the OBSS Scan period. Thereafter, until a setting is configured so as to allow channel switching, even if the STA 101 receives the TDLS Channel Switch Request, the STA 101 operates so as to refuse or ignore it.

The STA 101, upon configuring a setting so as to prohibit channel switching, transmits a TDLS Channel Switch Response to the STA 103 over the off-channel in order to stop communication with the STA 103 over the off-channel (S907). Then, the STA 101 again switches its channel to the base channel in accordance with the transmission of this TDLS Channel Switch Response (S908). The STA 103 switches its channel to the base channel in accordance with reception of the TDLS Channel Switch Response (S909). Note that the order of steps S908 and S909 may possibly be reversed for the same reason as that in steps S903 and S904.

The STA 101, upon returning its channel to the base channel, starts the OBSS Scan. Specifically, the STA 101 scans (searches) 1ch to 11ch for other networks in order (S910, S911, S914, S918, S919). Note that FIG. 9 does not show the scan of 5ch to 10ch, for the sake of simplification.

Here, assume that a TDLS Channel Switch Request is transmitted from the STA 103 over 3ch, which is the base channel, while the STA 101 is scanning 2ch. However, in this case, the STA 101 is scanning 2ch and accordingly does not receive this TDLS Channel Switch Request (S913). Assume that, thereafter, a TDLS Channel Switch Request is transmitted from the STA 103 over 3ch, which is the base channel, while the STA 101 is scanning 3ch. In this case, since the channel that the STA 101 is scanning is 3ch, the STA 101 receives this TDLS Channel Switch Request (S916). However, since the STA 101 configures a setting so as to prohibit channel switching in step S906, the STA 101 transmits a TDLS Channel Switch Response in which REFUSED is designated as a Status Code (S917). Note that what is important here is that the STA 101 does not switch its channel to the off-channel, and other methods may also be used. For example, the STA 101 may be configured to ignore the TDLS Channel Switch Request and not to respond thereto.

The STA 101, upon completing the scan up to 11ch, returns to 3ch, which is the base channel (S920). Then the STA 101, after returning to 3ch, notifies the AP 102 of a result of the OBSS Scan using a 20/40 BSS Coexistence Management frame (S921). Note that the 20/40 BSS Coexistence Management frame is a frame that is defined in the IEEE802.11n standard and is for notifying a connected AP of information regarding surrounding BSSes.

The STA 101, after notifying the AP 102 of the scan result, performs direct communication setting control (S922). Specifically, the STA 101 removes prohibition of channel switching that is set in step S906, and configures a setting so as to permit channel switching of TDLS. After the permission of channel switching is set in step S922, if the STA 101 receives a TDLS Channel Switch Request from the STA 103 (S924), the STA 101 accepts this request. That is to say, in this case, the STA 101 transmits a TDLS Channel Switch Response in which SUCCESS is designated as a Status Code to the STA 103 (S925). In the subsequent processing, as in steps S903 to S905, the STA 101 and the STA 103 switch their channel to the off-channel and exchange data through direct communication.

Figure 10:
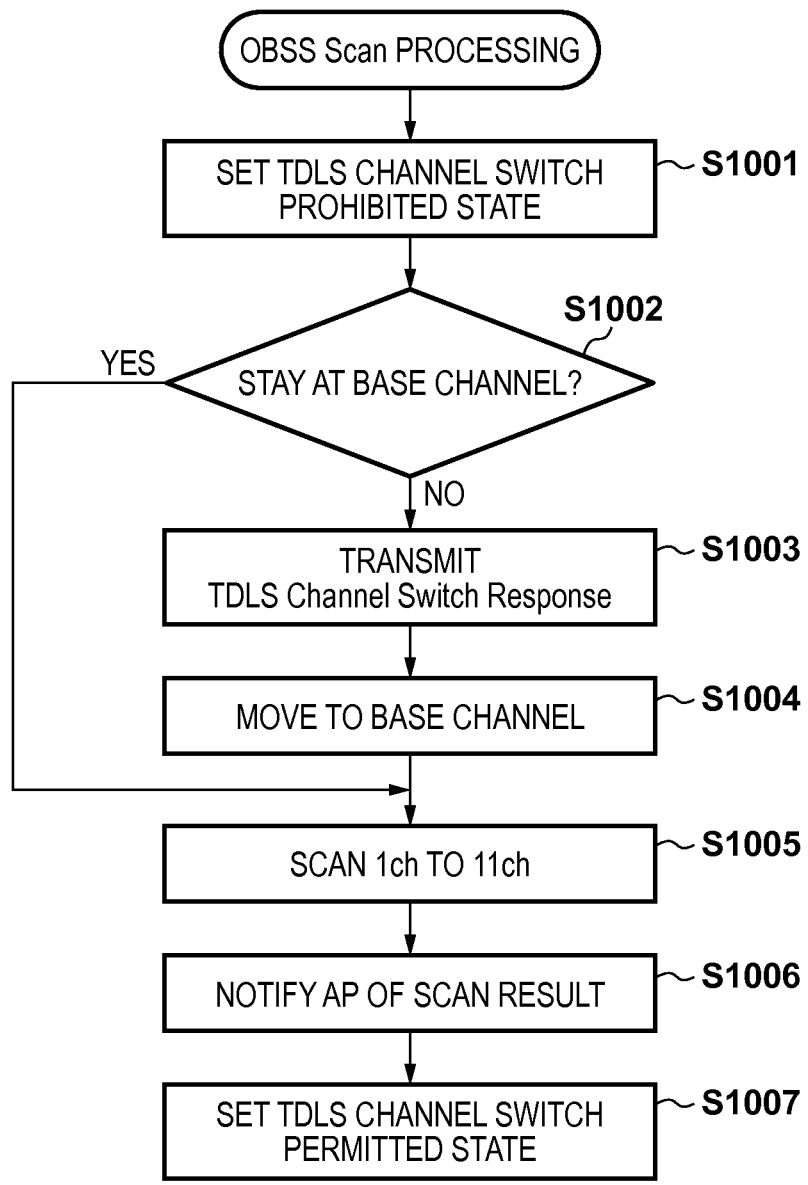
FIG. 10 is a flowchart showing an operation example of the STA 101 at the time of the OBSS Scan in the fourth example in Embodiment 1.

Subsequently, processing at the time of the OBSS Scan of the STA 101 in this example will be described using a flowchart in FIG. 10. This processing is executed at the timing of starting the OBSS Scan. Note that the time interval of the OBSS Scan execution is designated by a Probe Response transmitted by the AP 102. More specifically, this time interval is designated by a BSS Channel Width Trigger Scan Interval in the information of an OBSS Scan Parameters element contained in the Probe Response.

Initially, when the timing of starting the OBSS Scan comes, the STA 101 configures a setting so as to prohibit channel switching of TDLS (S1001). This is processing similar to the processing described in the above description of step S906. The STA 101, after configuring the setting so as to prohibit channel switching of TDLS, refuses the received TDLS Channel Switch Request or does not respond thereto.

Next, the STA 101 determines whether the channel at which the STA 101 is currently staying is the base channel (S1002). At this time, if the STA 101 is staying at the base channel (YES in S1002), the processing proceeds to step S1005. On the other hand, if the STA 101 is not staying at the base channel due to channel switching, i.e., the STA 101 is staying at the off-channel (NO in S1002), the STA 101 transmits a TDLS Channel Switch Response (S1003). The STA 101 thereby notifies the STA 103 of switching of the channel to the base channel. This processing corresponds to step S907 described above. After this notification, the STA 101 returns to the base channel (S1004). This processing corresponds to step S908 described above.

The STA 101, upon returning to the base channel, executes scan of 1ch to 11ch in order (S1005). This processing corresponds to steps S913, S914, S917, S922, and S923 described above. Then the STA 101, upon completing the scan, notifies the AP 102 of a scan result using a 20/40 BSS Coexistence Management frame (S1006). This processing corresponds to step S921 described above.

The STA 101, after notifying the AP 102 of the scan result, sets a state where channel switching of TDLS is permitted that has been in a prohibited state due to the setting in step S1001 (S1007). This processing corresponds to step S922 described above, and after this setting, if the STA 101 receives the TDLS Channel Switch Request, the STA 101 responds so as to accept this request.

With this configuration, even when the STA 101 has joined the wireless network 104 with the 2.4-GHz HT40, the STA 101 can execute stable OBSS Scan by prohibiting channel switching of TDLS during a time period during which the OBSS Scan is executed. In this example, unlike in the above processing examples 1 to 3, even if the frequency band of the wireless network 104 is a 2.4-GHz band, the STA 101 can join the wireless network 104 with the HT40 while establishing a direct connection. Since the STA 101 can switch the channel in a direct connection unless the STA 101 is executing the OBSS Scan, the STA 101 can directly communicate with other STAs over the off-channel in accordance with the situation, while communicating with the AP with the HT40 that enables high-speed communication.

Note that, although a setting is configured in step S922 so as to permit channel switching of TDLS in the above description, the STA 101 may also configure a setting so as to prohibit channel switching of TDLS after this setting, in accordance with the situation excluding the OBSS Scan. For example, if the STA 101 receives a data packet from the AP 102, or if the STA 101 needs to transmit data to the AP 102, channel switching during this time period may be prohibited.

In the description of this example, although the time period during which channel switching of TDLS is prohibited is started at the timing of starting the OBSS Scan, the prohibition period may start at an earlier timing than the timing of starting the OBSS Scan. For example, the time period during which channel switching is prohibited may start at a timing of the AP 102 transmitting a Beacon immediately before the timing of starting the OBSS Scan. It is thereby possible to prevent unnecessary switching between the base channel and the off-channel from occurring when the OBSS Scan is started immediately after the channel of TDLS is switched.

In this example, as described regarding steps S908 and S1004, the STA 101 returns to the base channel if the timing of starting the OBSS Scan comes while the STA 101 is staying at the off-channel. However, the STA 101 may start the OBSS Scan without necessarily returning to the base channel. For example, the STA 101 may move to 1ch from the off-channel, namely 9ch, without returning to the base channel, namely 3ch, and may perform the OBSS Scan from 1ch in order. However, as a result of temporarily moving from the off-channel to the base channel before starting the OBSS Scan, processing for moving among the channels for the OBSS Scan is facilitated. That is to say, with this operation, the STA 101 can easily return to the original base channel by causing the STA 101 to always return, after executing the OBSS Scan, to the channel at which the STA 101 was staying before starting the OBSS Scan.

As described above, in the present embodiment, the STA 101 restricts establishment of a direct connection to the STA 103 and switching of the channel when the operation mode of a connection to the AP 102 is a mode (e.g., 2.4-GHz HT40) in which the OBSS Scan is executed. It is thereby possible to stabilize the OBSS Scan operation.

Embodiment 2

In the present embodiment, the STA 101 performs control so as to change the operation mode of the first connection if the second connection to the STA 103 is established or the channel is switched when the operation mode of the first connection to the AP 102 is the 2.4-GHz HT40. That is to say, if the second connection is established or the channel is switched, the STA 101 switches the operation mode such that the operation mode of the first connection is a mode in which the periodic search for other networks, such as the OBSS Scan, is not performed. It is thereby possible to prevent the OBSS Scan from being executed when channel switching occurs, and to avoid execution of an unstable OBSS Scan.

Functional Configuration of STA 101

Figure 11:
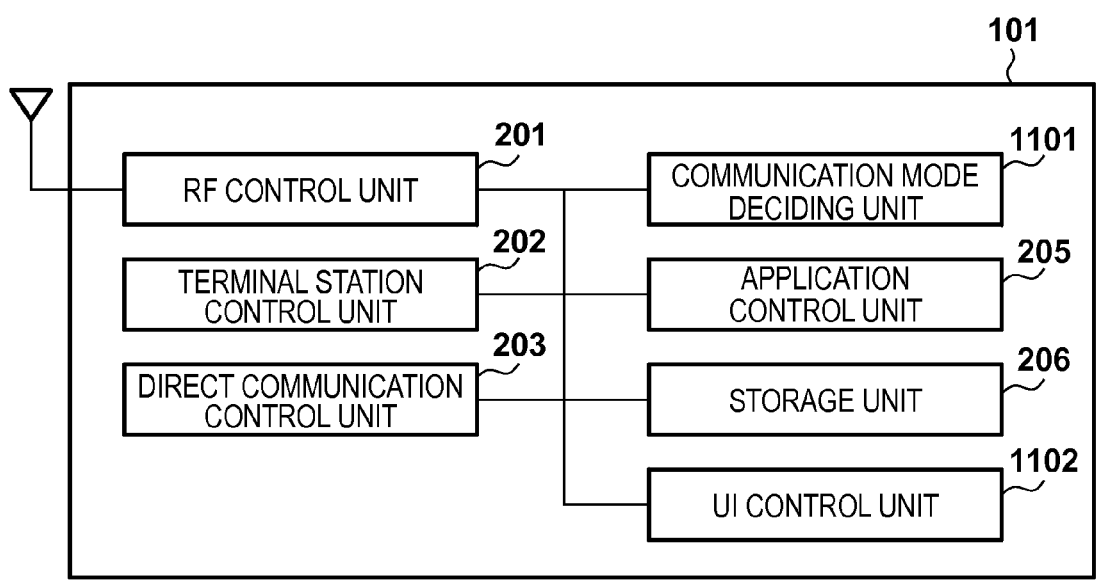
FIG. 11 is a block diagram showing an exemplary functional configuration of a STA 101 in Embodiment 2.

FIG. 11 is a block diagram showing an exemplary functional configuration of the STA 101 according to the present embodiment. The STA 101 has an RF control unit 201, a terminal station control unit 202, a direct communication control unit 203, an application control unit 205, a storage unit 206, a communication mode deciding unit 1101, and an UI control unit 1102, for example. Note that the RF control unit 201, the terminal station control unit 202, the direct communication control unit 203, the application control unit 205, and the storage unit 206 are similar to the functional units that are given the same reference numerals in FIG. 2, and accordingly a description thereof will be omitted.

The communication mode deciding unit 1101 is configured to include a program for deciding to join the wireless network 104 with the HT20 or to join it with the HT40, for example. Processing of the communication mode deciding unit 1101 is executed when receiving a TDLS Setup Request and TDLS Teardown, and the details thereof will be described later using FIGS. 12 and 16, respectively. The UI (User Interface) control unit 1102 is a UI with which a user (not shown) of the STA 101 operates the STA 101, and is configured to include hardware and a program that constitute the UI, for example. With the UI control unit 1102, the user can set whether to activate or inactivate TDLS of the STA 101.

Processing Flow

In the present embodiment, the STA 101, when, for example, establishing a direct connection to the STA 103, checks whether the operation mode of the first connection to the AP 102 is a first mode in which the periodic search for other networks is performed while the connection has been established, such as the 2.4-GHz HT40. If, for example, the operation mode of the first connection is the first mode, the STA 101 performs control so as to change the operation mode to a mode in which the periodic search for other networks is not performed while the connection has been established, such as the HT20. A flow of this processing will be described below using FIGS. 12 to 19.

Processing Example 1

Figure 12:
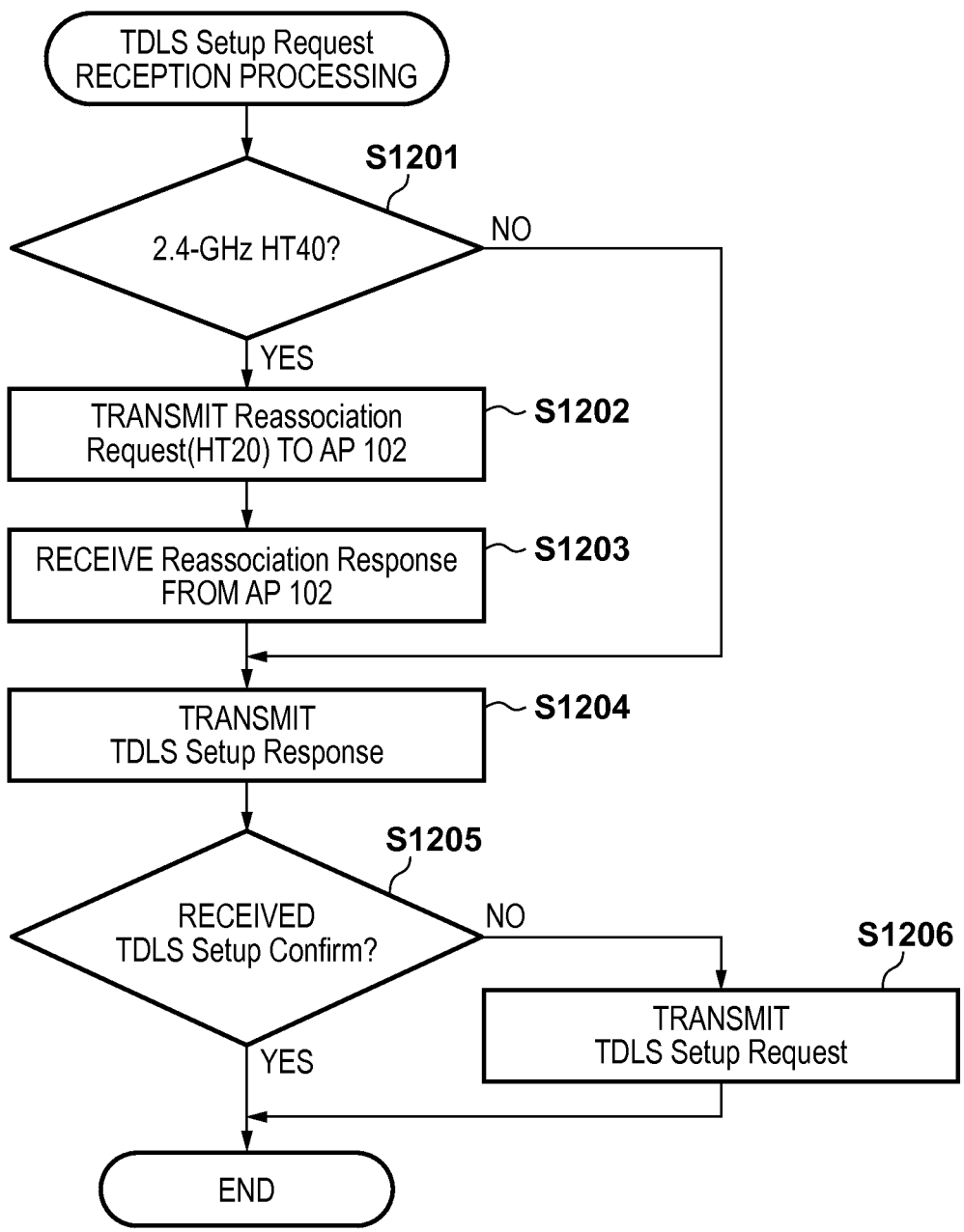
FIG. 12 is a flowchart showing a first operation example of communication mode decision processing in Embodiment 2.

FIG. 12 shows a first example of a processing flow in the present embodiment. FIG. 12 is a flowchart showing a flow of communication mode decision processing of the communication mode deciding unit 1101 when the STA 101 receives a TDLS Setup Request. This processing is executed if a TDLS Setup Request is received from the STA 103.

The communication mode deciding unit 1101 initially determines whether or not the STA 101 has joined the wireless network 104 with the 2.4-GHz HT40 (S1201). If the STA 101 has joined the wireless network 104 in an operation mode other than the 2.4-GHz HT40 (NO in S1201), the STA 101 does not need to execute the OBSS Scan. For this reason, the STA 101 transmits a TDLS Setup Response as-is (S1204) and establishes a direct connection to the STA 103.

On the other hand, if it is determined that the STA 101 has joined the wireless network 104 with the 2.4-GHz HT40 (YES in S1201), the STA 101 transmits a Reassociation Request to the AP 102 (S1202). At this time, Supported Channel Width Set in an HT Capabilities Info field of an HT Capabilities element that is added to the Reassociation Request is set to 0. That is to say, the STA 101 gives the AP 102 a request to rejoin the wireless network 104 with the HT20.

The STA 101, upon transmitting the Reassociation Request, receives the Reassociation Response transmitted from the AP 102 (S1203). A connection with the HT20 is thereby established, and execution of the OBSS Scan becomes unnecessary. Thereafter, if the connection to the AP 102 is in a security mode such as WPA-PSK or WPA2-PSK, the STA 101 may execute key exchange processing with the AP 102.

Next, the STA 101 transmits, to the STA 103, a TDLS Setup Response as a response to the TDLS Setup Request received before the determination in step S1201 (S1204). The STA 101 then waits for reception of TDLS Setup Confirm as a response to the TDLS Setup Response from the STA 103 for a fixed time period (S1205). At this time, if the TDLS Setup Confirm is received (YES in S1205), it means that a direct connection has been established, and accordingly the processing is finished.

On the other hand, if the TDLS Setup Confirm is not received (NO in S1205), it is determined that the received TDLS Setup Request is timed out at the STA 103. The STA 101 then transmits a TDLS Setup Request to the STA 103 in order to establish a direct connection (S1206). The subsequent processing is similar to the usual TDLS Setup processing, and a direct connection is thereby established. As a result of the processing in these steps S1205 and S1206, the STA 101 can establish a direct connection to the STA 103 even if the processing in steps S1201 to S1203 takes time and the TDLS Setup Request of the STA 103 is timed out.

Figure 13:
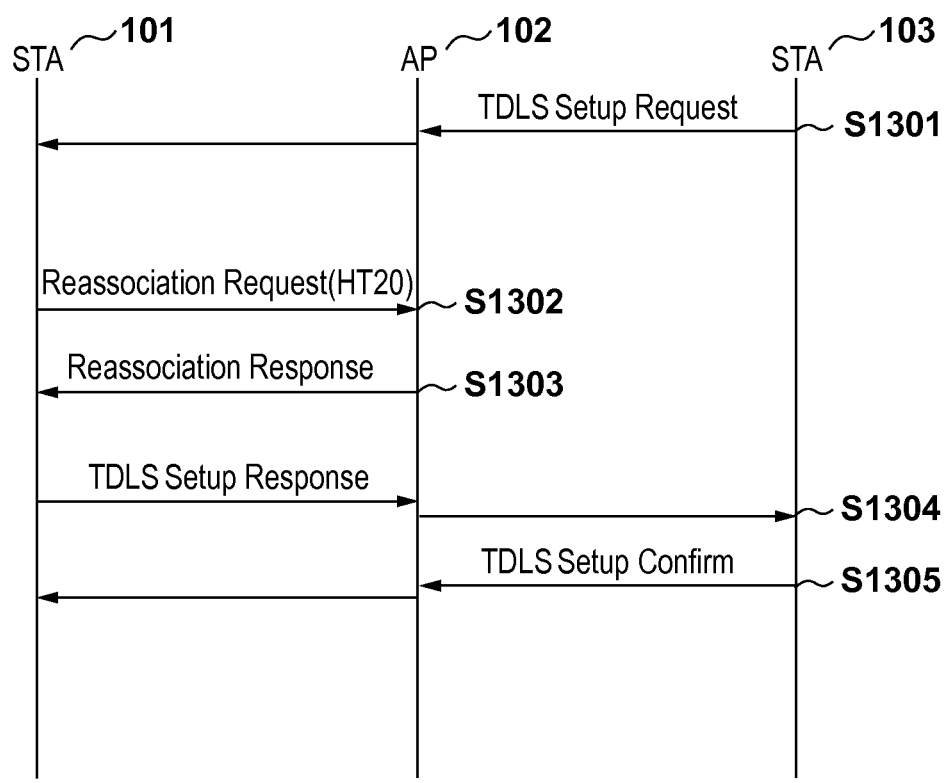
FIG. 13 is a sequence chart showing an example of a processing flow in the first operation example in Embodiment 2.
Figure 14:
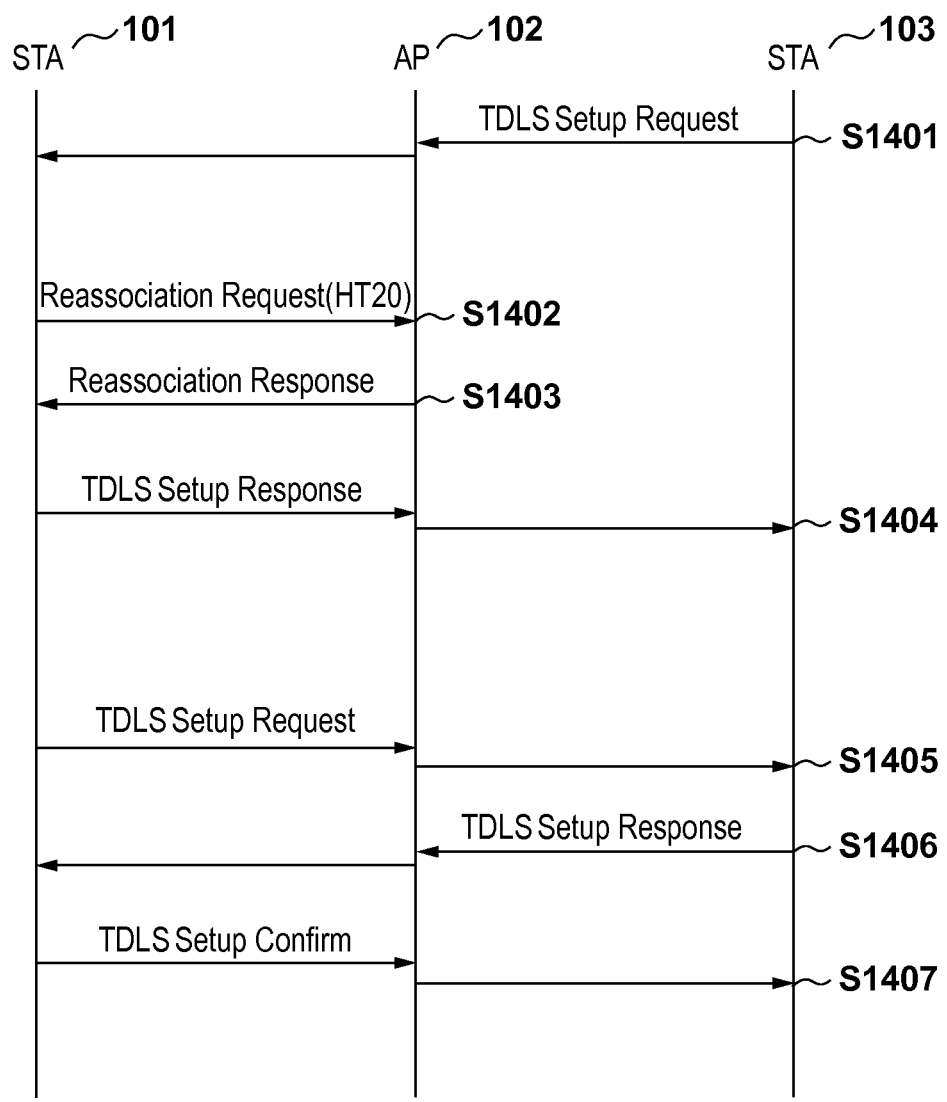
FIG. 14 is a sequence chart showing another example of the processing flow in the first operation example in Embodiment 2.
Figure 15:
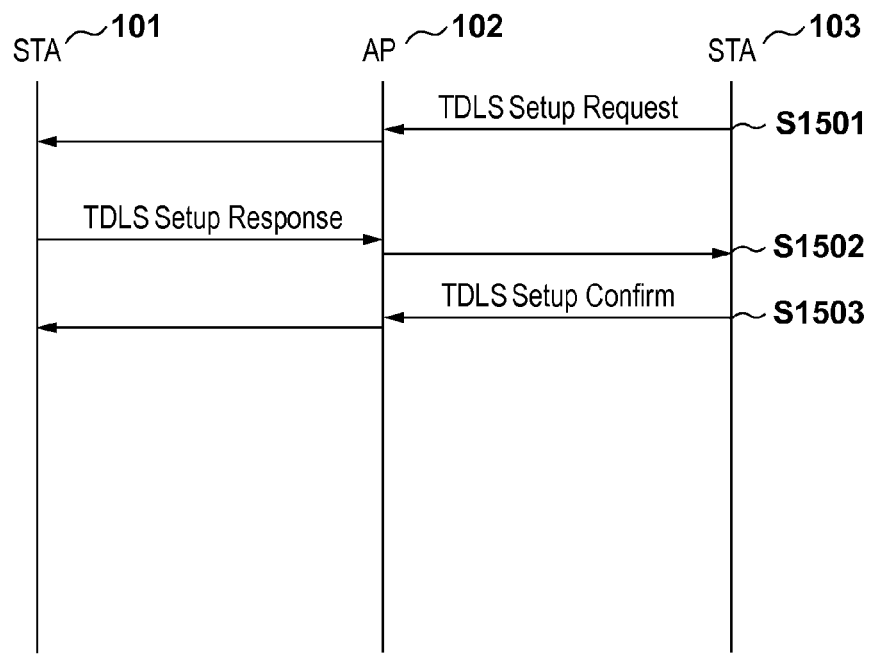
FIG. 15 is a sequence chart showing still another example of the processing flow in the first operation example in Embodiment 2.

A flow of the above processing in the overall wireless communication system will be described using sequence charts in FIGS. 13 to 15. FIGS. 13 and 14 show processing flows in the case where the STA 101 has joined the wireless network 104 with the 2.4-GHz HT40. On the other hand, FIG. 15 shows a processing flow in the case where the STA 101 has joined the wireless network 104 in the 2.4-GHz HT20. FIG. 13 shows a processing flow in the case where the TDLS Setup Request of the STA 103 is not timed out, and FIG. 14 shows a processing flow in the case where it is timed out.

In FIG. 13, initially, the STA 103 transmits a TDLS Setup Request to the STA 101 (S1301). The STA 101, upon receiving the TDLS Setup Request, executes the determination in step S1201 using the communication mode deciding unit 1101. In FIG. 13, since the STA 101 has joined the wireless network 104 with the 2.4-GHz HT40, the STA 101 transmits a Reassociation Request to the AP 102 (S1202, S1302). The STA 101 thereby gives a request to join the wireless network 104 with the HT20. Thereafter, a Reassociation Response is transmitted from the AP 102 to the STA 101 (S1303). Then the STA 101 transmits, to the STA 103, a TDLS Setup Response as a response to step S1301 (S1304). The STA 103, upon receiving the TDLS Setup Response, transmits TDLS Setup Confirm (S1305). The STA 101 can thereby establish a direct connection to the STA 103 while joining the wireless network 104 in the 2.4-GHz HT20.

FIG. 14 shows an exemplary case where the TDLS Setup Response in step S1304 in FIG. 13 is timed out at the STA 103. Processing in steps S1401 to S1404 is similar to the processing in steps S1301 to S1304, and accordingly a description thereof will be omitted. If a timeout occurs in step S1404, the STA 103 ignores the TDLS Setup Response and does not transmit the TDLS Setup Confirm in step S1305. In this case, the STA 101 executes the processing in step S1206 in accordance with the determination in step S1205 in FIG. 12. That is to say, if the TDLS Setup Confirm is not returned (NO in S1205), the STA 101 transmits the TDLS Setup Request to the STA 103 (S1206, S1405). The STA 103 transmits the TDLS Setup Response to the STA 101 in response to reception of the TDLS Setup Request (S1406). The STA 101 then transmits the TDLS Setup Confirm to the STA 103 in response to reception of the TDLS Setup Response. A direct connection between the STA 101 and the STA 103 is thereby established. As a result, even if the TDLS Setup Request of the STA 103 is timed out, the STA 101 can establish a direct connection to the STA 103 while joining the wireless network 104 in the 2.4-GHz HT20.

FIG. 15 shows a processing flow in the case where the STA 101 has joined the wireless network 104 in the 2.4-GHz HT20. In this case as well, upon the STA 103 transmitting the TDLS Setup Request to the STA 101 (S1501), the determination in step S1201 is executed in the STA 101, as in the example in FIG. 13. At this time, since the STA 101 has joined the wireless network 104 in the 2.4-GHz HT20, the STA 101 subsequently executes the processing in step S1204. That is to say, the STA 101 transmits the TDLS Setup Response without performing Reassociation processing (S1502). The STA 103, upon receiving the TDLS Setup Response, transmits TDLS Setup Confirm as a response thereto (S1503). In this manner, when the STA 101 has joined the wireless network 104 in the 2.4-GHz HT20, the operation mode (frequency bandwidth) between the AP 102 and the STA 101 is not changed.

After the operation mode is switched from the 2.4-GHz HT40 to the HT20 by the above processing, if the direct connection is disconnected or switching of the channel in the direct connection stops, the operation mode may be returned to the HT40 from the HT20. Processing in this case will be described using FIG. 16.

Figure 16:
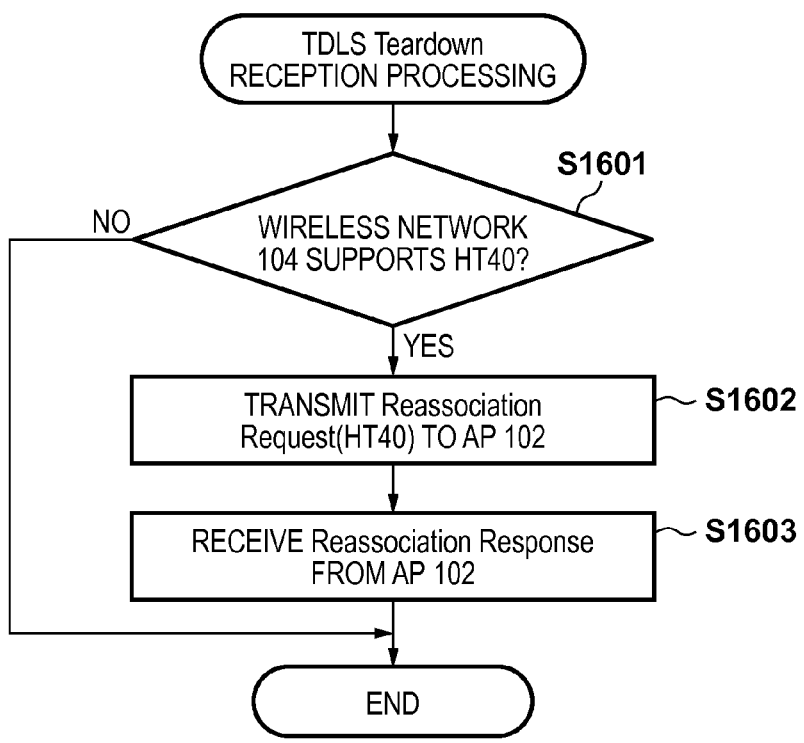
FIG. 16 is a flowchart showing a second operation example of the communication mode decision processing in Embodiment 2.

FIG. 16 is a flowchart of processing of the communication mode deciding unit 1101 at the time when the STA 101 receives TDLS Teardown after establishing a direct connection to the STA 103. This processing is executed if the STA 101 receives the TDLS Setup Request from the STA 103.

In this processing, the STA 101, upon receiving the TDLS Teardown for disconnecting the direct connection from the STA 103 to which the STA 101 has established a direct connection, determines whether or not the wireless network 104 supports the 2.4-GHz HT40 (S1601). This determination can be performed by checking an HT Capabilities element contained in a Beacon that is lastly received from the AP 102. More specifically, the STA 101 checks the value of Supported Channel Width Set in an HT Capabilities Info field of the HT Capabilities element. For example, if the value is 1, the STA 101 can determine that the wireless network 104 supports both the HT20 and the HT40, and if the value is 0, the STA 101 can determine that the wireless network 104 supports only the HT20.

If the wireless network 104 supports the HT40 (YES in S1601), the STA 101 transmits a Reassociation Request to the AP 102 in order to join the wireless network 104 with the HT40 (S1602). At this time, the Supported Channel Width Set in the HT Capabilities Info field of the HT Capabilities element that is added to the Reassociation Request is set to 1. The STA 101, after transmitting the Reassociation Request to the AP 102, receives a Reassociation Response from the AP 102 (S1603). The STA 101 can thereby join the wireless network 104 with the 2.4-GHz HT40. On the other hand, if the wireless network 104 does not support the HT40 (NO in S1601), switching from the HT20 to the HT40 is not performed, and the STA 101 maintains the state of having joined the wireless network 104 with the HT20.

Thus, when establishing a direct connection, the operation mode of a connection to the AP is changed from the HT40 to the HT20. It is thereby possible to prevent occurrence of the OBSS Scan in the middle of switching the channel. Furthermore, if the established direct connection is disconnected, the operation mode of the connection to the AP is changed from the HT20 to the HT40. The STA 101 can thereby perform high-speed communication with the AP 102 using the HT40 when a direct connection is not established.

In the above description, when the TDLS
Setup Request is received, the operation mode of a connection to a wireless network is changed from the 2.4-GHz HT40 to the HT20, thereby preventing the OBSS Scan from being executed when channel switching of TDLS occurs. However, any methods other than the above method may be employed as long as the operation mode is changed from the 2.4-GHz HT40 to the HT20 and the OBSS Scan is prevented from being executed when channel switching of TDLS occurs.

For example, not the TDLS Setup Request but other triggers may also be used with which a situation can be understood, e.g., with which it can be determined that channel switching may possibly occur. As an example, when the TDLS Discovery Request or the TDLS Channel Switch Request is received, the operation mode of a connection to the wireless network may be changed from the 2.4-GHz HT40 to the HT20. In the above mode, the operation mode of the connection to the wireless network 104 is changed from the HT20 to the HT40 when the TDLS Teardown is received. However, the present invention is not limited to this method, and other modes in which the operation mode can be changed from the HT20 to the HT40 when the direct connection is disconnected (connection is released) may be used in the wireless network 104. For example, the operation mode of the connection to the network may be changed from the HT20 to the HT40 after the TDLS Teardown is transmitted from the STA 101. Furthermore, the operation mode of the connection to a network may be changed from the HT20 to the HT40 when the STA 101 or the STA 103 transmits the Channel Switch Response for switching the channel from the off-channel to the base channel. That is to say, the operation mode of the connection to the network may be returned to the HT40 when the channel is returned to the base channel due to the finish of the communication over the switched channel.

Processing Example 2

In this example, the STA 101 sets the operation mode of a connection to the AP to the HT20 if TDLS has been activated, and sets the operation mode of the connection to the AP to the HT40 if TDLS has been inactivated. It is thereby possible to prevent occurrence of the OBSS Scan during channel switching of TDLS, and an unstable OBSS Scan is not executed.

Figure 17:
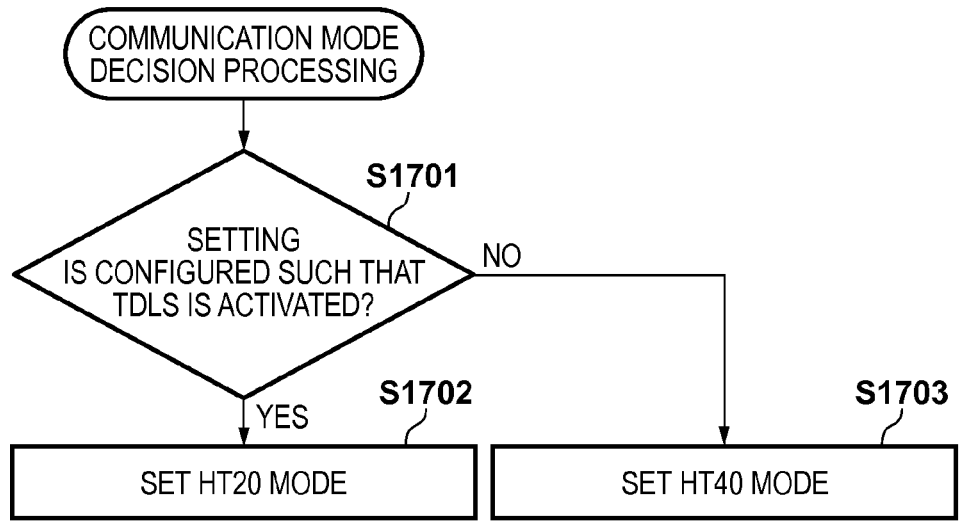
FIG. 17 is a flowchart showing a third operation example of the communication mode decision processing in Embodiment 2.

In this example, the communication mode deciding unit 1101 is configured to include a program for deciding, when joining a 2.4-GHz wireless network, to join the network with the HT20 or to be connected to the HT40 if TDLS is set by the UI control unit 1102. Since the OBSS Scan does not need to be executed when joining a 5-GHz wireless network, in this case, the STA 101 joins the wireless network with the HT40 regardless of whether TDLS has been set. Processing of the communication mode deciding unit 1101 is executed if TDLS is set by the UI control unit 1102. FIG. 17 shows a flow of the processing executed by the communication mode deciding unit 1101 if TDLS is set by the UI control unit 1102.

Upon TDLS being set, the communication mode deciding unit 1101 determines whether TDLS has been activated or inactivated (S1701). If the communication mode deciding unit 1101 determines that TDLS has been activated (YES in S1701), the communication mode deciding unit 1101 sets the operation mode of the connection to the AP to the HT20 (S1702). That is to say, when joining the 2.4-GHz wireless network, the communication mode deciding unit 1101 joins the network with the HT20 such that the STA 101 does not execute the OBSS Scan. With this configuration, even when the STA 101 joins the 2.4-GHz wireless network and a direct connection is established, the channel control does not become complicated due to channel switching of TDLS.

On the other hand, if the communication mode deciding unit 1101 determines that TDLS has been inactivated in step S1701 (NO in S1701), the communication mode deciding unit 1101 sets the operation mode of the connection to the AP to the HT40 (S1703). That is to say, in this case, when joining the 2.4-GHz wireless network, the STA 101 joins the network with the HT40 and also executes the OBSS Scan. With this operation, when TDLS has been inactivated and is unnecessary, the STA 101 joins the wireless network 104 with the HT40 in which higher-speed communication can be performed than with the HT20, and can thereby communicate, at a high speed, with a STA that has joined the wireless network 104.

Figure 18:
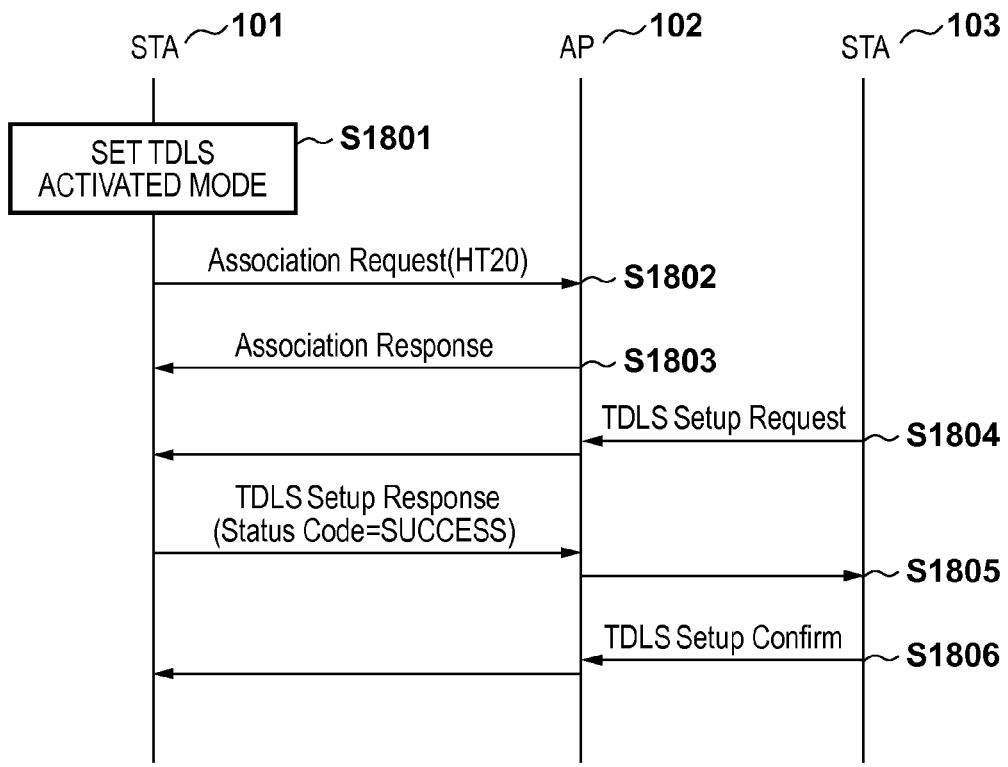
FIG. 18 is a sequence chart showing an example of a processing flow in the third operation example in Embodiment 2.
Figure 19:
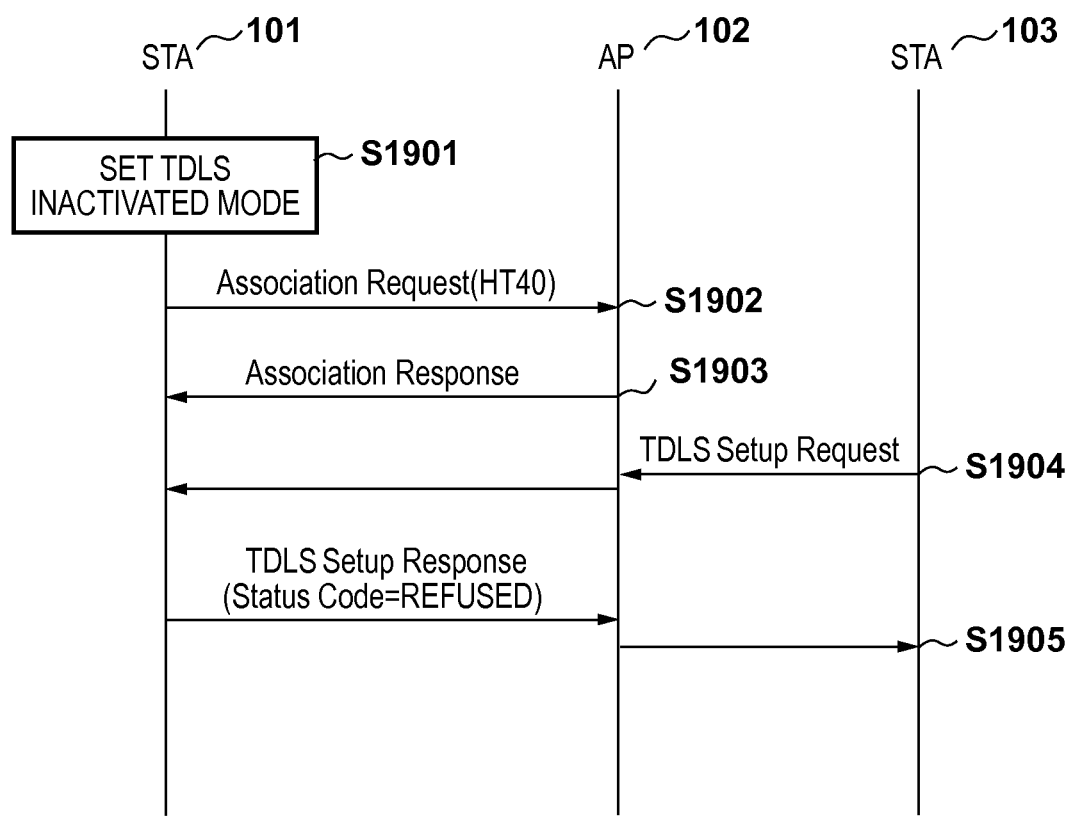
FIG. 19 is a sequence chart showing another example of the processing flow in the third operation example in Embodiment 2.

FIGS. 18 and 19 are sequence charts showing processing flows in the case where the STA 101 joins a 2.4-GHz wireless network 104 that supports the HT40 when TDLS has been activated and inactivated, respectively.

In FIG. 18, TDLS is activated by the user through the UI control unit 1102 (S1801). If TDLS is activated, the processing in step S1702 in FIG. 17 is executed, and accordingly the STA 101 transmits, to the AP 102, an Association Request in which the HT20 is designated as the operation mode (S1802). That is to say, in this case, the Supported Channel Width Set in the HT Capabilities Info field of the HT Capabilities element is set to 0. Thereafter, the STA 101 receives an Association Response, which is a response from the STA 103 (S1803). The STA 101 can thereby join the wireless network 104 with the HT20. In this case, the STA 101 does not execute the OBSS Scan since the STA 101 has joined the wireless network with the HT20. If the STA 101 receives a TDLS Setup Request from the STA 103 at this time (S1804), the STA 101 responds thereto using a TDLS Setup Response with a Status Code that is SUCCESS, since TDLS is active (S1805). The STA 103, upon receiving the TDLS Setup Response, transmits a TDLS Setup Confirm (S1806). Thus, a direct connection between the STA 101 and the STA 103 can be established. Thereafter, when the STA 101 receives a TDLS Channel Switch Request from the STA 103, channel switching of TDLS is executed in conformity to the IEEE802.11 specification.

In FIG. 19, TDLS is inactivated by the user through the UI control unit 1102 (S1901). If TDLS is inactivated, the processing in step S1703 in FIG. 17 is executed, and accordingly the STA 101 transmits, to the AP 102, an Association Request in which the HT40 is designated as the operation mode (S1902). That is to say, in this case, the Supported Channel Width Set with the HT Capabilities Info field of the HT Capabilities element is set to 1. Thereafter, the STA 101 receives an Association Response, which is a response from the STA 103 (S1903). The STA 101 can thereby join the wireless network 104 with the HT40. In this case, the STA 101 periodically executes the OBSS Scan since the STA 101 has joined the wireless network with the HT40. If the STA 101 receives a TDLS Setup Request from the STA 103 at this time (S1904), the STA 101 responds thereto using a TDLS Setup Response with a Status Code that is REFUSED, since TDLS is inactive (S1905). Thus, a direct connection between the STA 101 and the STA 103 is not established, and channel switching of TDLS is not performed either.

Although the response is made using the TDLS Setup Response with the Status Code that is SUCCESS/REFUSED depending on whether TDLS has been activated/inactivated in the description of this example, the present invention is not limited thereto. For example, the STA 101 may be configured not to respond when TDLS is inactive. The STA 101 may also be configured not to respond to the TDLS Discovery Request. That is to say, in both cases, the STA 101 may be configured to operate as a STA that does not support TDLS.

In this example, activation and inactivation of TDLS is set by the user through the UI. However, other methods may be used. Furthermore, activation/inactivation of channel switching of TDLS, rather than activation/inactivation of TDLS, may be set by the user. For example, a setting may be configured such that TDLS is active and channel switching is inactive. Note that, in this case, the STA 101 cannot perform offloading of wireless channels but can communicate with the STA 103 through a direct connection thereto without depending on the capability of the AP 102, and accordingly can perform efficient communication when the AP 102 has low capability.

Instead of the user explicitly setting activation and inactivation of TDLS, a functional unit for configuring this setting may be provided within the STA 101. For example, a configuration may be employed in which the STA 101 activates TDLS if wireless LAN control is executed by a Wi-Fi Display application, and inactivates TDLS if wireless LAN control is executed by other applications. This is because, when TDLS is used with Wi-Fi Display, there is a possibility of occurrence of transmission and reception of a large volume of data to/from a STA that is a partner device to which a direct connection has been established, whereas communication with the AP is not considered to be important, in some cases. In such cases, the communication with the STA to which a direct connection has been established can be made more efficient if the communication with the AP is performed only with the HT20 and the OBSS Scan is not executed instead. That is to say, interruption of video transmission by means of Wi-Fi Display can be prevented by causing the OBSS Scan not to be executed.

Although this example has described the case of setting either activation or inactivation of TDLS through the UI control unit 1102 before being connected to the AP 102, activation and inactivation of TDLS may be able to be set after the connection to the AP 102 is established. In this case, the STA 101 can switch the operation mode of the connection to the wireless network by transmitting the Reassociation Request to the AP 102, as in the processing example 1 in Embodiment 2 above.

Note that, in the present embodiment, since the OBSS Scan is not executed in a situation where channel switching may possibly occur, the operation mode is changed from the 2.4-GHz HT40 to the HT20. However, the operation mode need only be changed such that the OBSS Scan is not executed, and other methods may be used. For example, the change of the joining of a wireless network in conformity to IEEE802.11b or IEEE802.11g may be performed, rather than the change of the operation mode from the 2.4-GHz HT40 to the HT20. Furthermore, not a 2.4-GHz band but a 5-GHz band may be used.

According to the present invention, in a communication system where a second connection is established based on a first connection, connection control can be performed in which the influence of the second connection on the first connection is considered.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-036001, filed Feb. 26, 2014, which is hereby incorporated by reference herein in its entirety.

What is claimed is:

1. A communication device comprising:
a connection unit configured to establish a first connection to a first other communication device, establish, based on the first connection, a second connection to a second other communication device that is connected to the first other communication device, while the first connection has been established, and perform direct communication with the second other communication device using the second connection;
a determination unit configured to determine whether an operation mode of the first connection is a mode in which a periodic search for another network is performed while a network has been established by the first connection; and
a control unit configured to, if the operation mode of the first connection is the mode in which the periodic search is performed, control the connection unit so as to restrict at least one of establishment of the second connection and switching of a channel in the second connection, while the first connection has been established.

2. The communication device according to claim 1, wherein, if the operation mode of the first connection is the mode in which the periodic search is performed, the control unit restricts establishment of the second connection by the connection unit, by not responding to a search for a partner device for the second connection, the search being performed by the second other communication device.

3. The communication device according to claim 1, wherein, if the operation mode of the first connection is the mode in which the periodic search is performed, the control unit restricts establishment of the second connection by the connection unit, by not responding to a request to establish the second connection from the second other communication device, or by refusing the request.

4. The communication device according to claim 1, wherein, if the operation mode of the first connection is the mode in which the periodic search is performed and the second connection has been established, the control unit restricts switching of the channel in the second connection by the connection unit, by not responding to a request to switch the channel in the second connection from the second other communication device, or by refusing the request.

5. The communication device according to claim 1, wherein the control unit restricts establishment of the second connection by the connection unit, by not responding to a search for a partner device for the second connection, the search being performed by the second other communication device, during a time period during which the periodic search is performed in the first connection.

6. The communication device according to claim 1, wherein, if a request to establish the second connection is given from the second other communication device during a time period during which the periodic search is performed in the first connection, the control unit restricts establishment of the second connection by the connection unit, by not responding to the request or by refusing the request.

7. The communication device according to claim 1, wherein, if a request to switch the channel in the second connection is given from the second other communication device during a time period during which the periodic search is performed in the first connection, the control unit restricts switching of the channel in the second connection by the connection unit, by not responding to the request or by refusing the request.

8. The communication device according to claim 1, wherein the mode in which the periodic search is performed is an operation mode in which higher-speed communication can be performed than in a mode in which the periodic search is not performed.

9. The communication device according to claim 1, wherein the periodic search is Overlapping Basic Service Set (OBSS) scan in a wireless LAN that conforms to the IEEE802.11 standard series.

10. A communication device comprising:
a connection unit configured to establish a first connection to a first other communication device, establish, based on the first connection, a second connection to a second other communication device that is connected to the first other communication device, while the first connection has been established, and perform direct communication with the second other communication device using the second connection;
a determination unit configured to determine whether an operation mode of the first connection is a first mode in which a periodic search for another network is performed while a network has been established by the first connection; and
a control unit configured to, if the operation mode of the first connection is the first mode, and establishment of the second connection or switching of a channel in the second connection is performed, perform control such that the operation mode of the first connection is switched to a second mode in which the periodic search for another network is not performed while the network has been established by the first connection.

11. The communication device according to claim 10, wherein the control unit switches the operation mode of the first connection from the first mode to the second mode by transmitting, to the first other communication device, a signal for giving a request to switch the operation mode.

12. The communication device according to claim 10, wherein, if the operation mode of the first connection is the first mode, the control unit performs control so as to switch the operation mode of the first connection from the first mode to the second mode in response to a search for a partner device for the second connection being performed by the second other communication device.

13. The communication device according to claim 10, wherein, if the operation mode of the first connection is the first mode, the control unit performs control so as to switch the operation mode of the first connection from the first mode to the second mode in response to a request to establish the second connection being given by the second other communication device.

14. The communication device according to claim 10, wherein, if the operation mode of the first connection is the first mode and the second connection has been established, the control unit performs control so as to switch the operation mode of the first connection from the first mode to the second mode in response to a request to switch the channel in the second connection being given by the second other communication device.

15. The communication device according to claim 10, wherein, if, after the operation mode of the first connection is switched from the first mode to the second mode, the second connection is disconnected or communication after the switching of the channel in the second connection is finished, the control unit performs control for switching the operation mode of the first connection from the second mode to the first mode.

16. The communication device according to claim 10, wherein, if the operation mode of the first connection is the first mode and a function related to the second connection in the connection unit is activated, the control unit performs control for switching the operation mode of the first connection from the first mode to the second mode.

17. The communication device according to claim 16, wherein, if the function related to the second connection in the connection unit is inactivated after the operation mode of the first connection is switched from the first mode to the second mode, the control unit performs control for switching the operation mode of the first connection from the second mode to the first mode.

18. A method for controlling a communication device having a connection unit configured to establish a first connection to a first other communication device, establish, based on the first connection, a second connection to a second other communication device that is connected to the first other communication device, while the first connection has been established, and perform direct communication with the second other communication device using the second connection, the method comprising:
   determining whether an operation mode of the first connection is a mode in which a periodic search for another network is performed while a network has been established by the first connection; and
   controlling the connection unit, if the operation mode of the first connection is the mode in which the periodic search is performed, so as to restrict at least one of establishment of the second connection and switching of a channel in the second connection, while the first connection has been established.

19. A method for controlling a communication device having a connection unit configured to establish a first connection to a first other communication device, establish, based on the first connection, a second connection to a second other communication device that is connected to the first other communication device, while the first connection has been established, and perform direct communication with the second other communication device using the second connection, the method comprising:
   determining whether an operation mode of the first connection is a first mode in which a periodic search for another network is performed while a network has been established by the first connection; and
   performing control, if the operation mode of the first connection is the first mode, and establishment of the second connection or switching of a channel in the second connection is performed, such that the operation mode of the first connection is switched to a second mode in which the periodic search for another network is not performed while the network has been established by the first connection.

20. A non-transitory computer-readable storage medium storing a computer program for causing a computer provided in a communication device, which has a connection unit configured to establish a first connection to a first other communication device, establish, based on the first connection, a second connection to a second other communication device that is connected to the first other communication device, while the first connection has been established, and perform direct communication with the second other communication device using the second connection, to execute:
   determining whether an operation mode of the first connection is a mode in which a periodic search for another network is performed while a network has been established by the first connection; and
   controlling the connection unit, if the operation mode of the first connection is the mode in which the periodic search is performed, so as to restrict at least one of establishment of the second connection and switching of a channel in the second connection, while the first connection has been established.

21. A non-transitory computer-readable storage medium storing a computer program for causing a computer provided in a communication device, which has a connection unit configured to establish a first connection to a first other communication device, establish, based on the first connection, a second connection to a second other communication device that is connected to the first other communication device, while the first connection has been established, and perform direct communication with the second other communication device using the second connection, to execute:
   determining whether an operation mode of the first connection is a first mode in which a periodic search for another network is performed while a network has been established by the first connection; and
   performing control, if the operation mode of the first connection is the first mode, and establishment of the second connection or switching of a channel in the second connection is performed, such that the operation mode of the first connection is switched to a second mode in which the periodic search for another network is not performed while the network has been established by the first connection.

* * * * *